United States Patent
Kondo

(10) Patent No.: US 11,227,370 B2
(45) Date of Patent: Jan. 18, 2022

(54) METHOD FOR GENERATING IMAGE PROCESSING FILTER AND IMAGE PROCESSING METHOD USING THE IMAGE PROCESSING FILTER

(71) Applicant: BROTHER KOGYO KABUSHIKI KAISHA, Nagoya (JP)

(72) Inventor: Masaki Kondo, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/034,732

(22) Filed: Sep. 28, 2020

(65) Prior Publication Data

US 2021/0097656 A1    Apr. 1, 2021

(30) Foreign Application Priority Data

Sep. 30, 2019 (JP) .............................. JP2019-180576
Sep. 30, 2019 (JP) .............................. JP2019-180577

(51) Int. Cl.
| | |
|---|---|
| G06T 5/20 | (2006.01) |
| H04N 1/58 | (2006.01) |
| H04N 1/64 | (2006.01) |
| G06T 5/00 | (2006.01) |
| G06N 3/08 | (2006.01) |

(52) U.S. Cl.
CPC ................ G06T 5/20 (2013.01); G06N 3/08 (2013.01); G06T 5/002 (2013.01); H04N 1/58 (2013.01); H04N 1/646 (2013.01); *G06T 2207/10008* (2013.01); *G06T 2207/10024* (2013.01); *G06T 2207/20081* (2013.01); *G06T 2207/20084* (2013.01); *H04N 2201/0094* (2013.01)

(58) Field of Classification Search
CPC . G06T 5/20; G06T 5/002; G06T 2207/20084; G06T 2207/20081; G06T 2207/10008; G06T 2207/10024; H04N 1/58; H04N 1/646; H04N 2201/0094; H04N 1/409; G06N 3/08

See application file for complete search history.

(56) References Cited

U.S. PATENT DOCUMENTS

2020/0285883 A1* 9/2020 Hiasa ...................... G06T 5/002

FOREIGN PATENT DOCUMENTS

| JP | 2006-157539 A | 6/2006 |
|---|---|---|
| JP | 2018-152670 A | 9/2018 |

\* cited by examiner

*Primary Examiner* — Christopher Wait
(74) *Attorney, Agent, or Firm* — Scully, Scott, Murphy & Presser, PC

(57) ABSTRACT

A method for generating an image processing filter includes: adjusting; and extracting. The adjusting inputs first training image data into a neural network to generate output image data, calculates an evaluation value based on a loss function using the output image data and second training image data, and adjusts a convolution filter so as to reduce the evaluation value. The extracting extracts data from the adjusted convolution filter as data for the image processing filter. A first training image includes noise and reproduces a test pattern. A second training image includes reduced noise and reproduces the test pattern. The loss function includes a first term and a second term. The first term specifies a magnitude of a difference between the output image data and the second training image data. The second term grows smaller as symmetry of the convolution filter relative to a filter axis of symmetry increases.

13 Claims, 16 Drawing Sheets

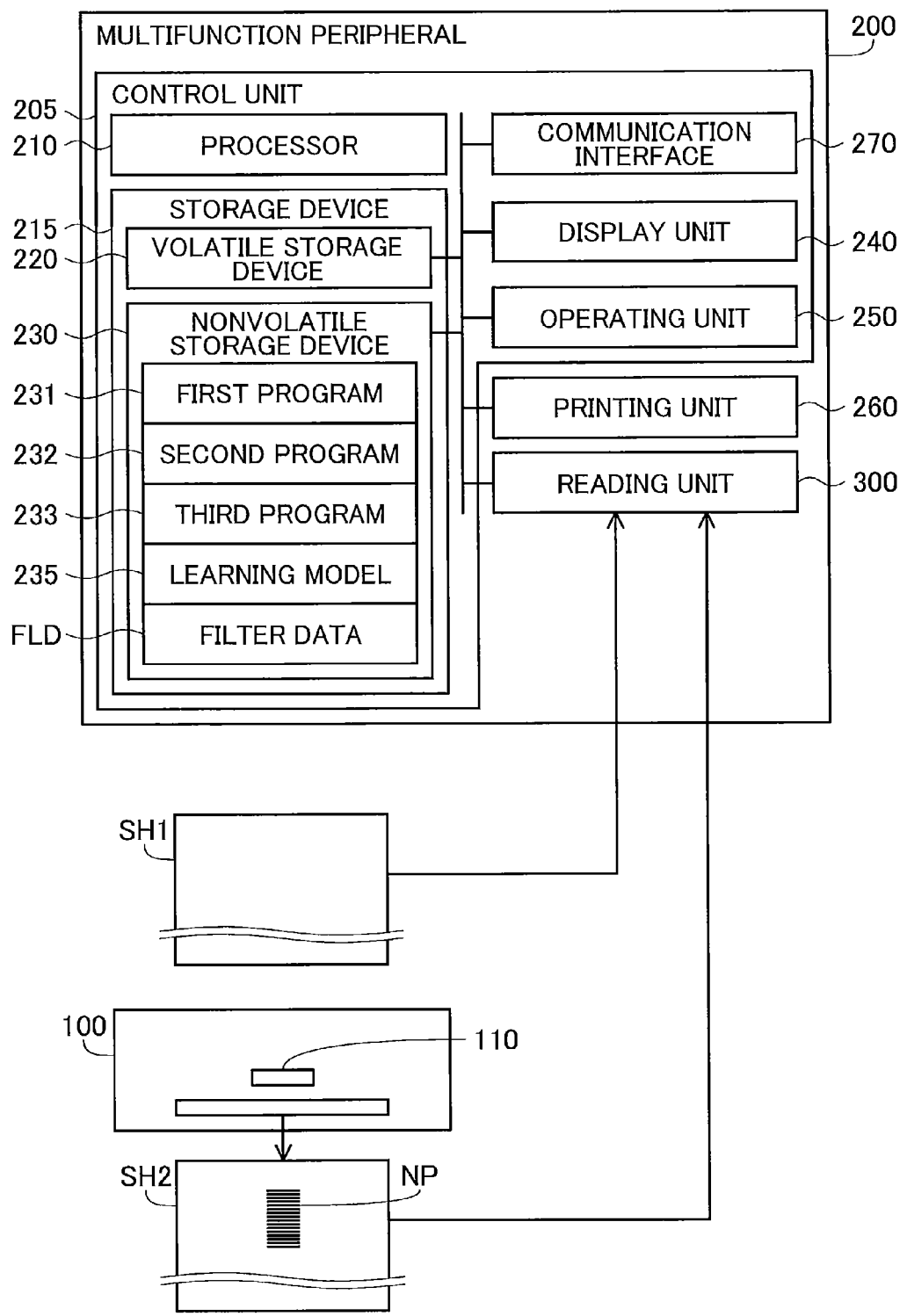

FIG. 8A
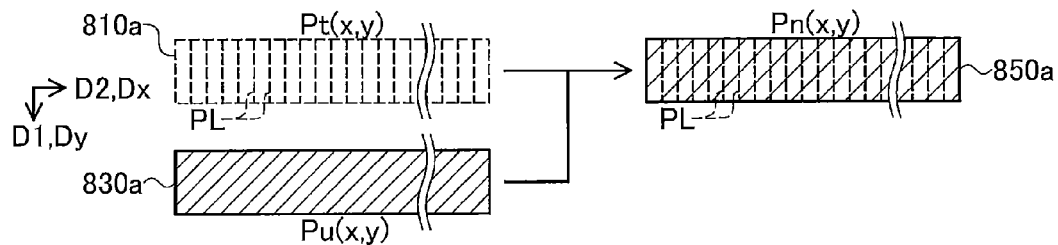
FIG. 8B
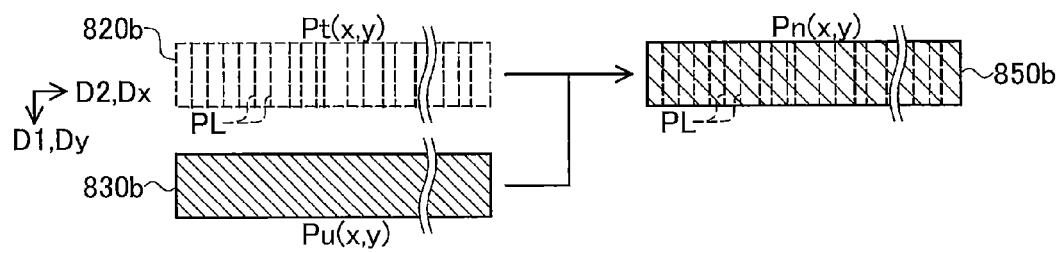
FIG. 8C
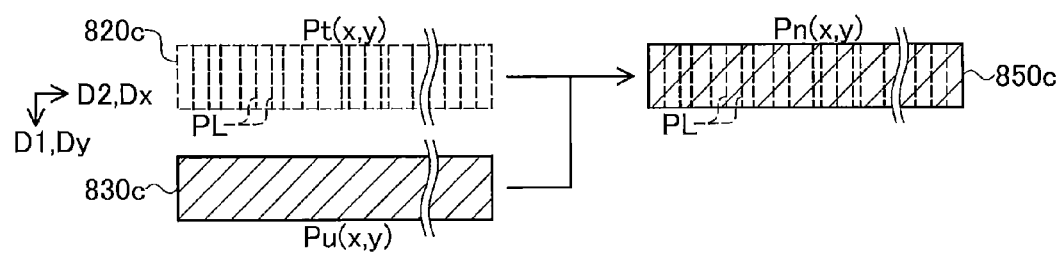
FIG. 8D
$$\begin{cases} Pn(x,y) = Pu(x,y) & (Pt(x,y) = 255) \\ Pn(x,y) = k1 \times Pu(x,y) + k2 \times Pt(x,y) & (Pt(x,y) < 255) \end{cases}$$

FIG. 9A
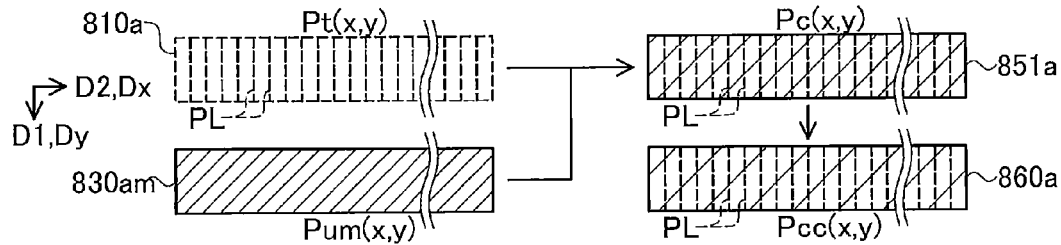
FIG. 9B
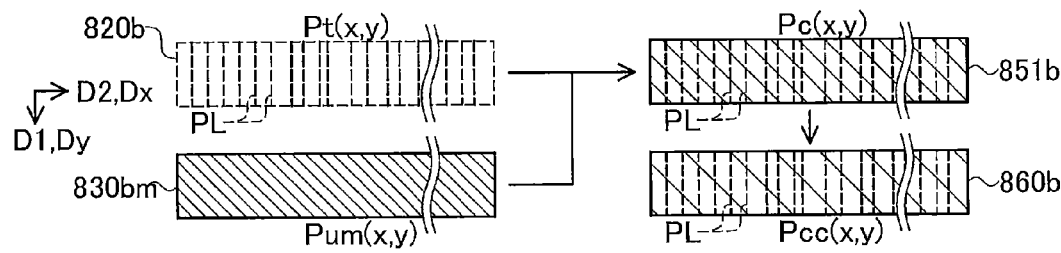
FIG. 9C
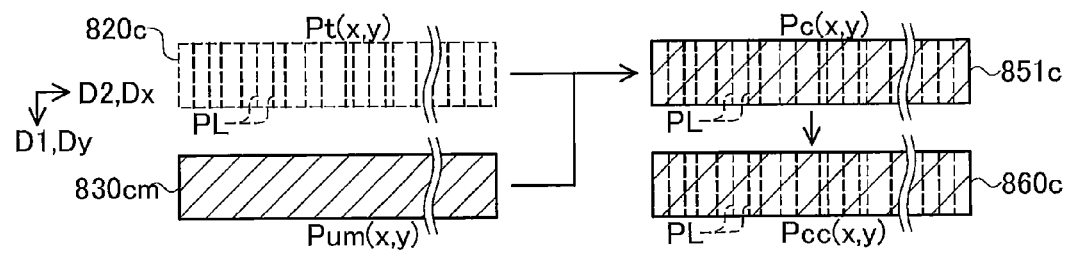
FIG. 9D
$$\begin{cases} Pc(x,y) = Pum(x,y) = mean(Pu) & (Pt(x,y) = 255) \\ Pc(x,y) = k1 \times Pum(x,y) + k2 \times Pt(x,y) & (Pt(x,y) < 255) \end{cases}$$
FIG. 9E
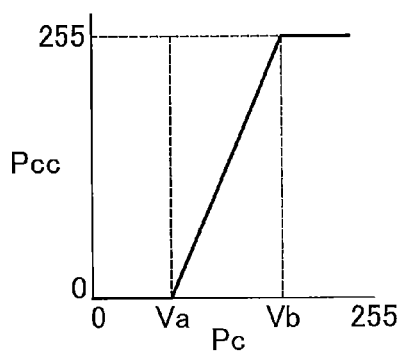

FIG. 10A
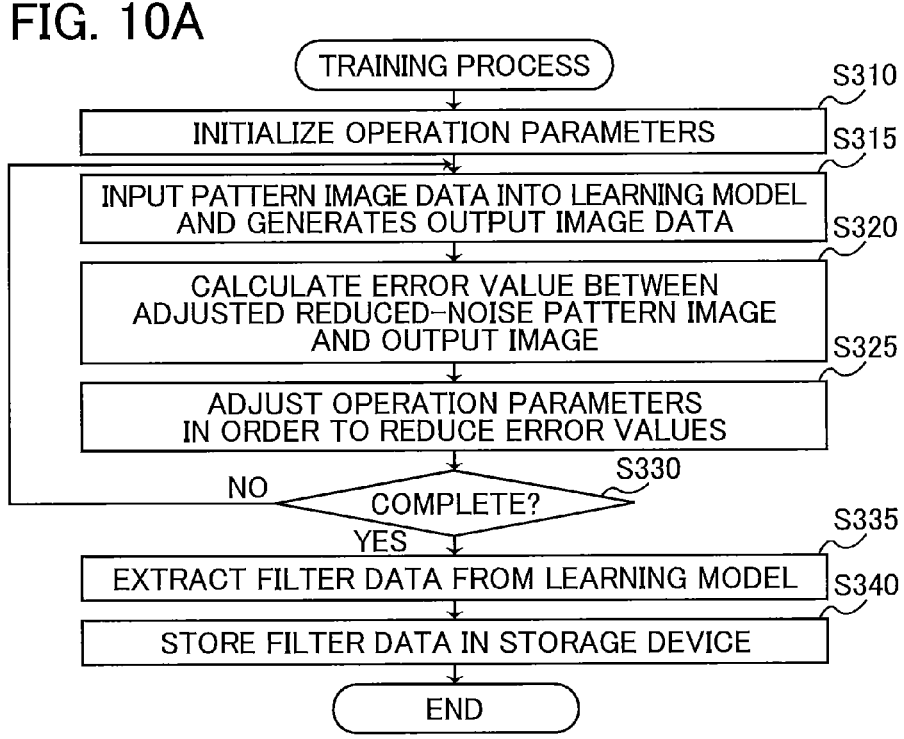
FIG. 10B
$$LF = Limg + Lfilter$$
$$Limg = \frac{1}{IW \times IH} \sum_{x=1}^{IW} \sum_{y=1}^{IH} \sqrt{\left(\frac{Po(x,y) - Pcc(x,y)}{255}\right)^2}$$
$$Lfilter = \frac{1}{\left(\frac{(Fx-1) Fy}{2}\right)} \sum_{i=1, j=1}^{i=(Fx-1)/2, j=Fy} |W(i,j) - W(Fx+1-i,j)|$$
FIG. 10C
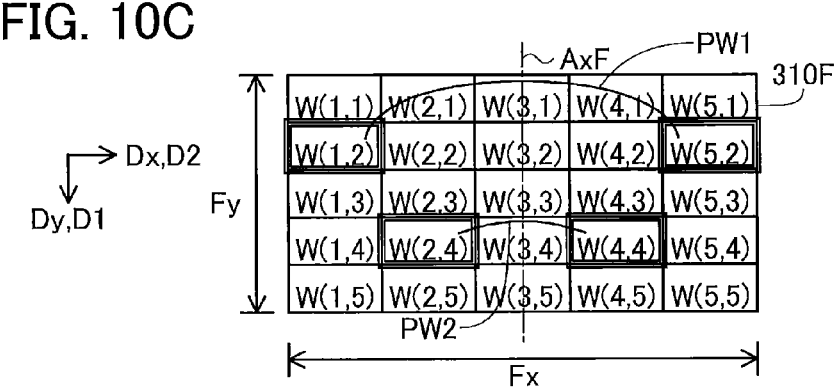

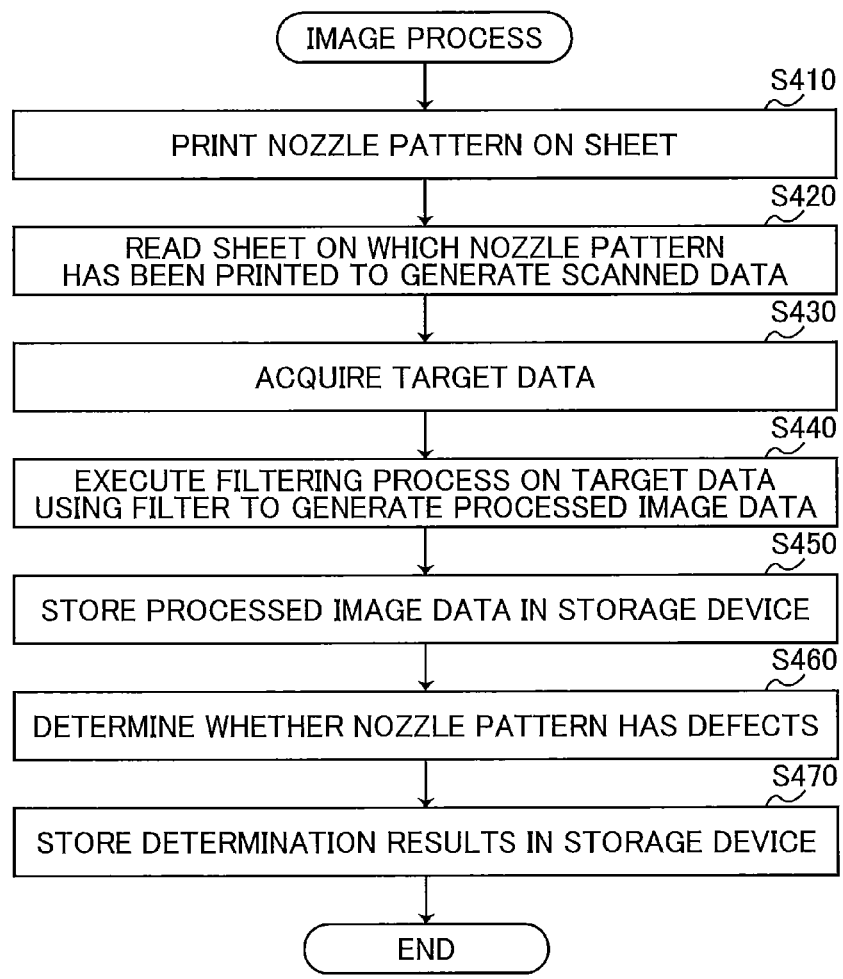

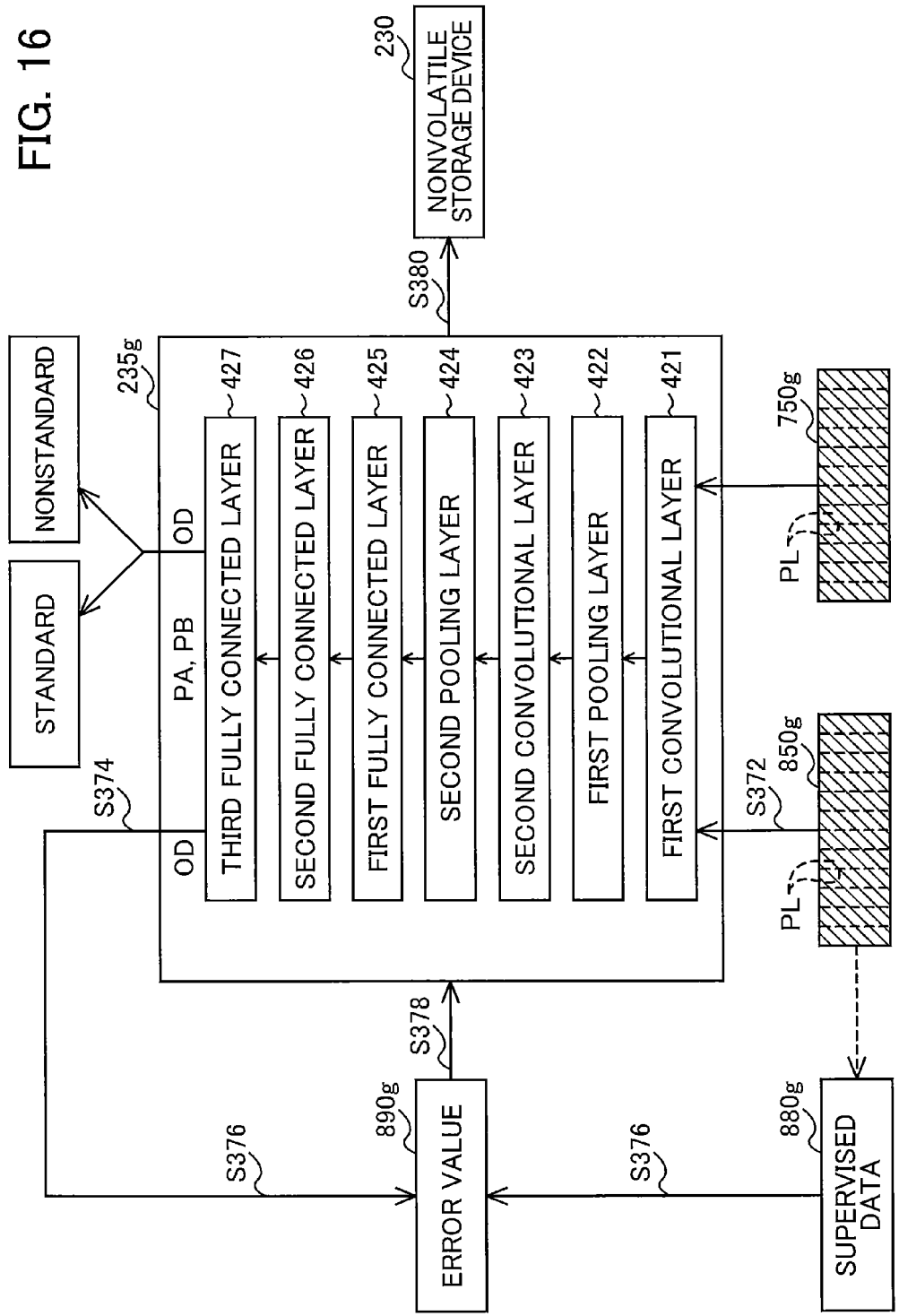

METHOD FOR GENERATING IMAGE PROCESSING FILTER AND IMAGE PROCESSING METHOD USING THE IMAGE PROCESSING FILTER

CROSS REFERENCE TO RELATED APPLICATION

This application claims priority from Japanese Patent Application No. 2019-180576 filed Sep. 30, 2019 and Japanese Patent Application No. 2019-180577 filed Sep. 30, 2019. The entire content of each of these priority applications is incorporated herein by reference.

TECHNICAL FIELD

The present disclosure relates to processing performed on image data using a filter and a prediction model for processing image data.

BACKGROUND

Conventional image processing includes various types and techniques. One proposed image processing technique involves determining color information for a background color in image data generated by an image reading device, such as a scanner, and removing the background from the image data in accordance with the determination results. This technique suppresses the appearance of off-colors in the image due to color deviation during reading. Specifically, the technique includes color correction to reduce the chroma in areas having a chroma less than or equal to a prescribed value.

Another proposed image processing technique uses filters. For example, Gaussian filters are used to perform smoothing processes, and edge enhancement filters are used to perform edge enhancement processes.

SUMMARY

However, image processing is performed on a variety of image data. For example, the image data may contain various types of noise. In such cases, the filters used to reduce noise in image data are not always capable of reducing noise in some image data. Moreover, a process for reducing noise aggressively may alter the position of the image. (For example, the noise reduction process may cause a shift in the positions of edge lines.)

More recently, techniques have been developed to process image data using predictions models, such as neural networks or support vector machines. The prediction model is trained using training image data in order to ensure appropriate processing. However, the training image data needed for suitable training is not easy to prepare.

In view of the foregoing, it is an object of the present disclosure to provide a technique capable of reducing noise while suppressing positional changes in the image caused by image processing.

It is another object of the present disclosure to provide a technique to generate suitable training image data for training a prediction model to process image data obtained through optical reading.

In order to attain the above and other objects, the present disclosure provides a method for generating an image processing filter for image processing. The method includes: adjusting; and extracting. The adjusting adjusts a convolution filter using a neural network to acquire an adjusted convolution filter. The convolution filter includes a plurality of weights corresponding to respective ones of a plurality of pixels within a filter region. The neural network is configured of a convolutional layer. The convolutional layer is configured to perform convolution using the convolution filter. The adjusting includes: inputting; calculating; and second adjusting. The inputting inputs first training image data into the neural network to generate output image data. The calculating calculates an evaluation value based on a loss function using the output image data and second training image data. The second adjusting adjusts the plurality of weights to respective ones of a plurality of adjusted weights so as to reduce the evaluation value. The adjusted convolution filter includes the plurality of adjusted weights. The extracting extracts data from the adjusted convolution filter as data for the image processing filter. The first training image data represents a first training image including noise. The first training image reproduces a test pattern including a specific part having a shape linearly symmetric to an axis of symmetry. The second training image data represents a second training image including reduced noise compared to the first training image. The second training image reproduces the test pattern. The loss function includes a first term and a second term. The first term specifies a magnitude of a difference between the output image data and the second training image data. The second term grows smaller as symmetry of the plurality of weights relative to a filter axis of symmetry in the filter region increases. The filter axis of symmetry is parallel to the axis of symmetry.

According to another aspect, the present disclosure provides an image processing method using an image processing filter. The image processing method includes: first generating; acquiring; second generating; and storing. The first generating generates data for the image processing filter in accordance with the method according to the above-described aspect. The acquiring acquires target data representing a nozzle pattern by optically reading the nozzle pattern printed on a sheet. The nozzle pattern is printed on the sheet by a printing device having a print head. The print head has a plurality of nozzles each of which configured to eject ink. The nozzle pattern includes a plurality of lines. The plurality of lines is parallel to each other. Each of the plurality of lines has a center axis and has a symmetric shape relative to the center axis. Each of the plurality of lines is printed by one of the plurality of nozzles. The second generating generates processed image data by executing an image process on the target data using the image processing filter. The storing stores the processed image data in a storage device.

According to still another aspect, the present disclosure provides a method for generating training image data to be used for training a prediction model. The method includes: (a) generating; and (b) storing. The (a) generating generates first training image data representing a first training image formed by arranging an object image of an object on a first background image. The first background image is at least a portion of a sheet image acquired by optically reading a sheet to be used for printing. The (b) storing stores the first training image data in a storing device. The (a) generating includes: (a1) setting; and (a2) setting. The (a1) setting sets a color value for a first object pixel within an object region of the first training image in which the object image is arranged. The color value for the first object pixel is set to a sum of a first value and a second value. The first value is obtained by multiplying a color value for a pixel corresponding to the first object pixel in the object image by a first object coefficient greater than zero. The second value is obtained by multiplying a color value for a pixel corresponding to the first object pixel in the first background image by a first background coefficient greater than zero. The (a2) setting sets a color value for a first background pixel within a nonobject region of the first training image in which the object image is not arranged. The color value for the first background pixel is set to a value obtained by multiplying a color value for a pixel corresponding to the first background pixel in the first background image by a coefficient greater than the first background coefficient.

According to still another aspect, the present disclosure provides a non-transitory computer readable storage medium storing a prediction model. The prediction model is installed on and executed by a computer. The prediction model, when executed by the computer, causes the computer to perform generating relevant data based on image data representing a sheet image. The sheet image is generated by optically reading a sheet on which an object is printed. The relevant data is data about the object. The prediction model has been trained using training image data representing a training image formed by arranging an object image of an object on a background image. The background image is at least a portion of a sheet image acquired by optically reading a sheet to be used for printing. The training image data is generated according to a method including: first setting; and second setting. The first setting sets a color value for an object pixel within an object region of the training image in which the object image is arranged. The color value for the object pixel is set to a sum of a first value and a second value. The first value is obtained by multiplying a color value for a pixel corresponding to the object pixel in the object image by an object coefficient greater than zero. The second value is obtained by multiplying a color value for a pixel corresponding to the object pixel in the background image by a background coefficient greater than zero. The second setting sets a color value for a background pixel within a nonobject region of the training image in which the object image is not arranged. The color value for the background pixel is set to a value obtained by multiplying a color value for a pixel corresponding to the background pixel in the background image by a coefficient greater than the background coefficient.

BRIEF DESCRIPTION OF THE DRAWINGS

The particular features and advantages of the disclosure as well as other objects will become apparent from the following description taken in connection with the accompanying drawings, in which:

FIG. 1 is an explanatory diagram illustrating a multifunction peripheral according to a first embodiment and a printing device that is separate from the multifunction peripheral;

FIGS. 8A through 8D are explanatory diagrams for noisy pattern images, in which FIG. 8A illustrates a noisy standard pattern image generated from a standard base pattern image and a first background image, FIGS. 8B and 8C respectively illustrate noisy nonstandard pattern images generated from respective nonstandard base pattern images and respective first background images, and FIG. 8D shows a formula for calculating first target luminance values for noisy pattern images;

FIGS. 9A through 9D are explanatory diagrams for reduced-noise pattern images, in which FIG. 9A illustrates a reduced-noise standard pattern image generated from a standard base pattern image and a second background image and an enhanced-contrast reduced-noise pattern image generated through a contrast enhancement process, FIGS. 9B and 9C respectively illustrate reduced-noise nonstandard pattern images generated from respective nonstandard base pattern images and respective second background images and enhanced-contrast reduced-noise pattern images generated through the contrast enhancement process, and FIG. 9D shows a formula for calculating second target luminance values for reduced-noise pattern images;

FIG. 9E is a graph showing an example of the contrast enhancement process executed on reduced-noise pattern image data, where the horizontal axis represents a pre-adjusted second target luminance value and the vertical axis represents an adjusted second target luminance value;

FIGS. 10A through 10C are explanatory diagrams describing a training process for the learning model, in which FIG. 10A is a flowchart illustrating steps in a training process for the learning model executed by the processor of the multifunction peripheral according to the first embodiment, FIG. 10B shows a sample loss function used for calculating an error value between an enhanced-contrast reduced-noise pattern image and an output image, and FIG. 10C is an explanatory diagram illustrating a filter and a filter axis of symmetry for explaining the second term of the loss function shown in FIG. 10B;

FIG. 12 is a flowchart illustrating steps in an image process executed by the processor of the multifunction peripheral according to the first embodiment using a convolution filter;

FIGS. 15A through 15D are explanatory diagrams of training image data generated in the third embodiment, in which FIGS. 15A and 15B illustrate noisy character images generated from respective character images and respective first background images, FIGS. 15C and 15D illustrate reduced-noise character images generated from respective character images and respective second background images and enhanced-contrast reduced-noise character images generated through the contrast enhancement process; and FIG. 16 is a block diagram illustrating a learning model of a fourth embodiment.

DETAILED DESCRIPTION

A. First Embodiment

A1. Device Configuration

Figure 2A:
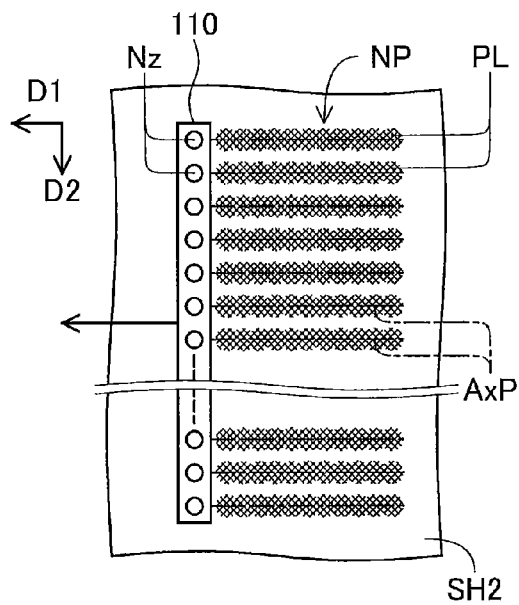
FIG. 2A is an explanatory diagram illustrating a sample nozzle pattern printed on a sheet and a print head provided with a plurality of nozzles and having no defects.

FIG. 1 is an explanatory diagram illustrating a data processing device according to an embodiment of the present disclosure. A multifunction peripheral 200 is used for data processing in the present embodiment. The multifunction peripheral 200 has a control unit 205, a printing unit 260, and a reading unit 300. The control unit 205 has a processor 210, a storage device 215, a display unit 240, an operating unit 250, and a communication interface 270. The above components are interconnected via a bus. The storage device 215 includes a volatile storage device 220, and a nonvolatile storage device 230.

The processor 210 is a device that performs data processing, such as a CPU. The volatile storage device 220 is configured of a DRAM, for example. The nonvolatile storage device 230 is a flash memory, for example.

The nonvolatile storage device 230 stores a first program 231, a second program 232, a third program 233, a learning model 235, and filter data FLD. In the present embodiment, the learning model 235 is an artificial neural network based prediction model, a machine learning model that has been trained through a training process described later. In the present embodiment, the learning model 235 is a program module. The learning model 235 will be described later in greater detail.

Various intermediate data that the processor 210 uses for executing the first program 231, second program 232, third program 233, and learning model 235 is temporarily stored in the storage device 215 (one of the volatile storage device 220 and nonvolatile storage device 230, for example).

The display unit 240 is a liquid crystal display, an organic EL display, an LED display, or the like that serves to display images. The operating unit 250 is a device that accepts user operations, such as a touchscreen arranged over the display unit 240, buttons, levers, and the like. The communication interface 270 is an interface for communicating with other devices. For example, the communication interface 270 may be a USB interface, a wired LAN interface, or a wireless communication interface conforming to the IEEE 802.11 standard.

The printing unit 260 prints images on paper (an example of the sheet) according to a prescribed method (an inkjet or laser printing method, for example).

The reading unit 300 is a reading device that optically reads an original or other object using a photoelectric conversion element, such as a CCD or CMOS. The reading unit 300 generates scan data representing the image that was read (hereinafter referred to as the "scanned image"). In the present embodiment, the scanned image is bitmap data representing the image in grayscale. Luminance values of bitmap data in the present embodiment are represented by 256 gradations from 0 to 255.

FIG. 1 also illustrates a printing device 100 that is separate from the multifunction peripheral 200. The printing device 100 is an inkjet type printing device that prints images on paper. In the present embodiment, the printing device 100 uses ink in the four colors cyan, magenta, yellow, and black. The printing device 100 is provided with a print head 110 having a plurality of nozzles for ejecting ink droplets. The print head 110 may have any of various nozzle-related defects. To identify such defects, the printing device 100 prints a nozzle pattern NP on a sheet SH2. The sheet SH2 is a sheet of paper in the present embodiment. However, another type of sheet, such as a sheet of fabric or film, may be used.

Figure 2B:
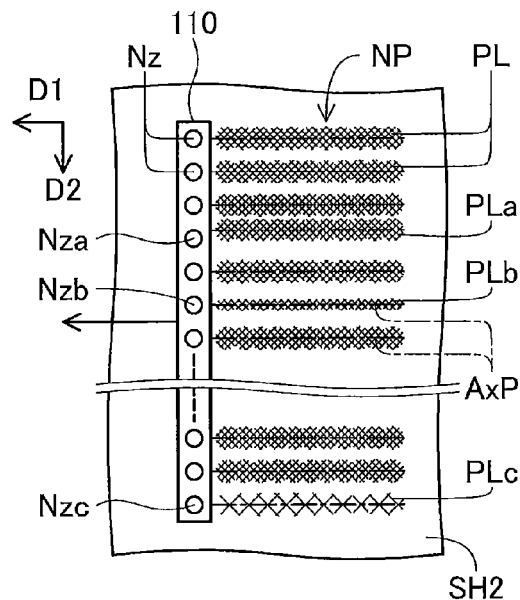
FIG. 2B is an explanatory diagram illustrating a sample nozzle pattern printed on a sheet and a print head provided with a plurality of nozzles and having defects.

FIGS. 2A and 2B are explanatory diagrams illustrating a sample nozzle pattern NP. FIG. 2A illustrates a case in which the print head 110 has no defects, while FIG. 2B illustrates a case in which the print head 110 has defects. Depicted in FIGS. 2A and 2B are the nozzle pattern NP printed on the sheet SH2, the print head 110, a plurality of nozzles Nz provided in the print head 110, and mutually perpendicular directions D1 and D2. Specifically, the drawings illustrate M number of nozzles Nz for ejecting ink of one color, where M is an integer greater than or equal to two. The nozzle pattern NP is printed using the M number of nozzles Nz for the color being processed.

The first direction D1 is the scanning direction of the print head 110. The printing device 100 is provided with a reciprocating device (not illustrated) for reciprocating the print head 110 in directions along the first direction D1. While being moved relative to the sheet in directions along the first direction D1, the print head 110 ejects ink droplets from the nozzles Nz to form ink dots on the sheet. The second direction D2 is the conveying direction of the sheet. The printing device 100 is provided with a conveying device (not illustrated) for moving the sheet in the second direction D2. The printing device 100 prints images on a sheet by repeatedly and alternately performing a scanning process for forming ink dots while moving the print head 110 and a conveying process for conveying the sheet.

The M number of nozzles Nz are arranged at different positions along the second direction D2 and specifically are spaced at equal intervals in the second direction D2. The nozzle pattern NP is configured of M number of lines PL aligned in the first direction D1. The M number of lines PL are juxtaposed in the second direction D2 orthogonal to the first direction D1. One line PL is printed by a single nozzle Nz in one scanning process. Each line PL has a center axis AxP indicated in the drawings. Each line PL is shaped to be symmetrical about the corresponding center axis AxP.

When there are no defects in the M number of nozzles (see the example of FIG. 2A), all M number of lines PL have the same color and the same width in the second direction D2. Additionally, the M number of lines PL are spaced at equal intervals in the second direction D2. Hereinafter, lines PL printed by defect-free nozzles Nz will be called standard lines.

In the example of FIG. 2B, three nozzles Nza, Nzb, and Nzc have defects. The position of a first line PLa printed by the first nozzle Nza deviates upstream in the second direction D2 from the intended position. Such positional deviations of ink dots may be caused by various factors, such as manufacturing defects of the nozzles Nz. A second line PLb printed by the second nozzle Nzb is narrower in width than a normal line PL. In other words, the size of the ink dots is smaller. This divergence in size of ink dots may be caused by various factors, such as a defect in the nozzle driving device (piezoelectric element, heater, or the like) used for ejecting ink droplets. A third line PLc printed by the third nozzle Nzc has a lighter color than a normal line PL. Such color variation may be caused by various factors, such as ink seepage within the print head 110 allowing ink of two colors to mix. If the configuration (position, width, density, etc.) of a line PL differs from the configuration of a standard line in this way, the nozzle Nz that printed this line PL has a defect. Hereinafter, a line PL having a configuration that differs from the configuration of a standard line will be called a nonstandard line.

In order to identify the configuration (position, width, density, etc.) of each line PL, the nozzle pattern NP is printed on the sheet SH2 and the reading unit 300 (see FIG. 1) reads the sheet SH2. Subsequently, an operator observes the scanned image of the nozzle pattern NP during manufacturing of the printing device 100, for example, to identify the configuration of each line PL and to detect defects in the nozzles Nz. Here, the cost of ink used to print the nozzle patterns NP can be reduced by printing the nozzle pattern NP at a low density. In this case, visibility of the nozzle pattern NP can be enhanced by performing brightness correction (contrast enhancement, for example) of the scanned image. However, simple brightness correction, such as correction that involves adjusting the tone curve, may enhance noise in addition to the nozzle pattern NP. For example, such brightness correction may enhance fiber patterns in the paper sheet SH2 or noise attributed to digital image processing. The learning model 235 (see FIG. 1) is designed to generate image data of the nozzle pattern NP by reducing noise in scanned data of the nozzle pattern NP.

Figure 3:
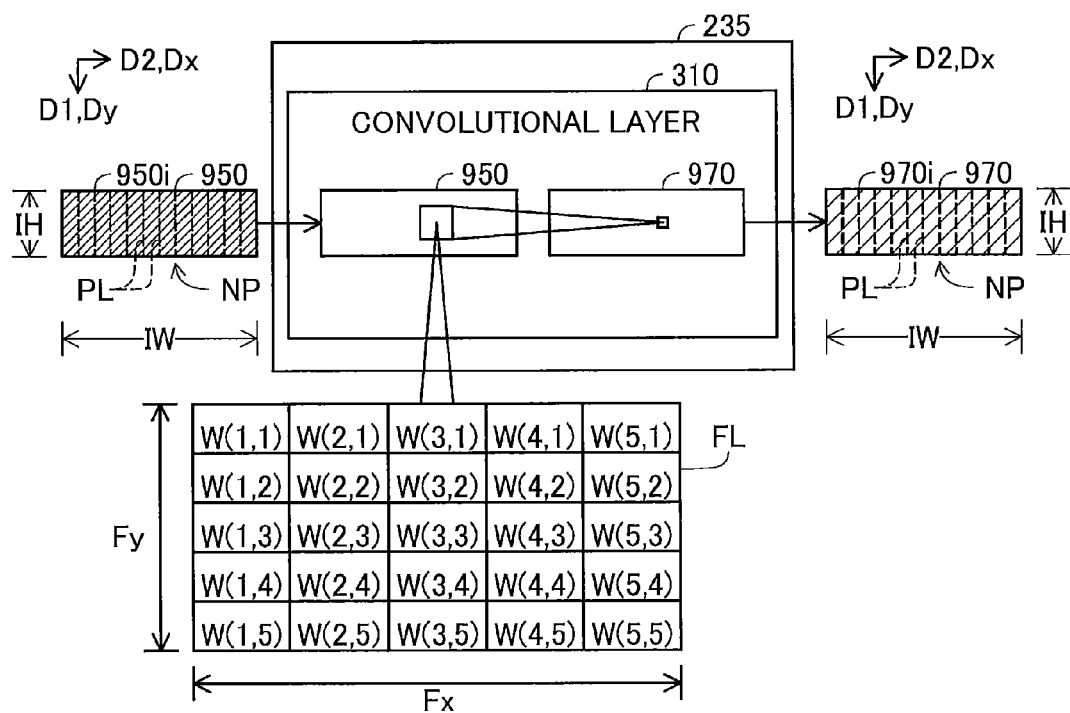
FIG. 3 is an explanatory diagram for a learning model of the first embodiment which uses input data representing an input image of a nozzle pattern to generate output data representing an output image of the same nozzle pattern.

FIG. 3 is an explanatory diagram for the learning model 235. As illustrated in FIG. 3, input data 950 representing an input image 950i of the nozzle pattern NP is inputted into the learning model 235. The input data 950 is obtained by executing a cropping process on the scanned data for the sheet SH2 (see FIG. 1). The cropping process cuts out the portion of the scanned data representing the nozzle pattern NP. The portion to be cut out is predetermined. As will be described later, the learning model 235 uses the input data 950 to generate output data 970 representing an output image 970i of the same nozzle pattern NP.

The input image 950i and output image 970i are both rectangular images having two sides aligned in a horizontal direction Dx and two sides aligned in a vertical direction Dy perpendicular to the horizontal direction Dx. The images 950i and 970i are expressed with color values (luminance values in the present embodiment) for a plurality of pixels arranged in a matrix having rows in the horizontal direction Dx and columns in the vertical direction Dy. The input image 950i has a predetermined size (a pixel number IW in the horizontal direction Dx and a pixel number IH in the vertical direction Dy). The output image 970i has the same size as the input image 950i. The directions D1 and D2 in FIG. 3 denote the directions D1 and D2 of the printing device 100 relative to the nozzle pattern NP. The following description will assume that the input data 950 is generated such that the first direction D1 is approximately equivalent to the vertical direction Dy and the second direction D2 is approximately equivalent to the horizontal direction Dx.

The learning model 235 in the present embodiment is configured of a single convolutional layer 310. The convolutional layer 310 executes convolution using a single convolution filter FL. Hereinafter, the convolution filter FL will simply be called the filter FL. Convolution is performed using the convolutional layer 310 to calculate correlation values representing correlations between inputted data and the filter FL. A horizontal size Fx in FIG. 3 denotes the size (number of pixels) of the filter FL in the horizontal direction Dx, and a vertical size Fy denotes the size (number of pixels) of the filter FL in the vertical direction Dy. In the present embodiment, Fx is an odd number five, and Fy is five. The filter FL includes (Fx×Fy) number of weights W. The numbers i and j included in parentheses for each weight W in FIG. 3 indicate a position i in the filter FL relative to the horizontal direction Dx and a position j in the filter FL relative to the vertical direction Dy.

From the input data 950, the convolutional layer 310 acquires a list of (Fx×Fy) number of luminance values for the (Fx×Fy) number of pixels in the portion of the input data 950 corresponding to the position of the filter FL. The convolutional layer 310 calculates an inner product of the acquired list and a list of (Fx×Fy) number of weights in the filter FL. The process of adding bias to the inner product is omitted in the present embodiment. The convolutional layer 310 inputs the inner product into an activation function. The value calculated by the activation function denotes the correlation value. In the present embodiment, the activation function is an identity function. By sliding the filter FL, the correlation value is calculated for the filter FL in a plurality of positions. The convolutional layer 310 generates bitmap data representing the correlation value for each position of the filter FL. This generated bitmap data is the output data 970. The position of each pixel in the output image 970i represents the position of the filter FL. In the present embodiment, convolution is performed so that the output image 970i has the same size (i.e., the same pixel numbers in the horizontal direction Dx and vertical direction Dy as the input image 950i). Hence, the stride (the sliding step) is one. Zero-padding is also performed to add pixels around the periphery of the input image 950i.

A2. Training Image Data Generating Process

Figure 4:
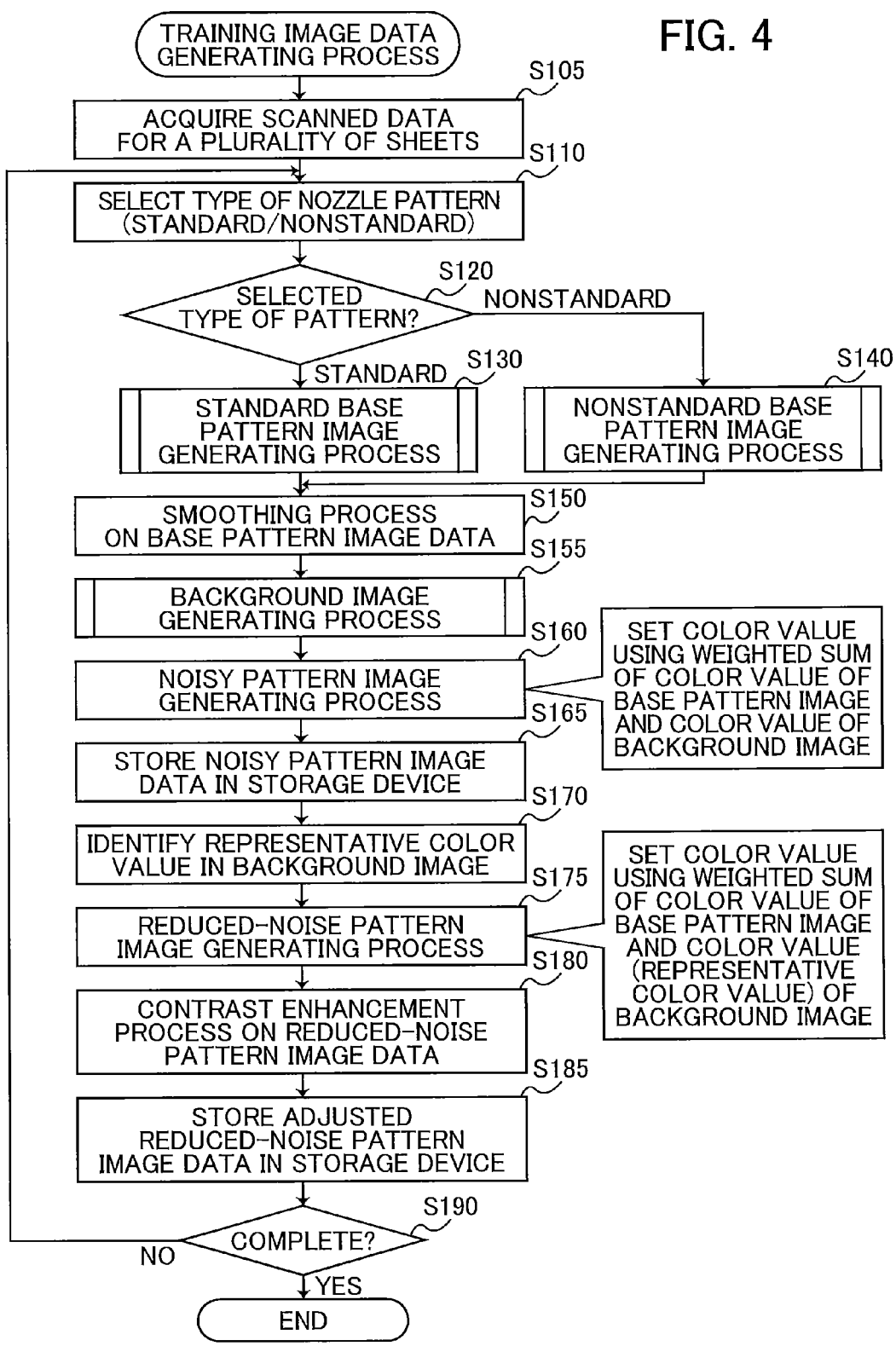
FIG. 4 is a flowchart illustrating steps in a training image data generating process executed by a processor of the multifunction peripheral according to the first embodiment.

FIG. 4 is a flowchart illustrating steps in a process for generating training image data (training image data generating process) to be used for training the learning model 235. The training image data generated in the present embodiment includes noisy data and reduced-noise data. The noisy data is image data of a nozzle pattern NP that includes noise. The reduced noise data is image data of the same nozzle pattern NP with reduced noise. In a training process described later, the noisy data is inputted into the learning model 235, causing the learning model 235 to generate output data. The weights in the filter FL are adjusted to decrease the difference between this output data and the reduced noise data. The trained learning model 235 (the learning model 235 after training) can then use image data for a nozzle pattern NP that includes noise to generate image data for the same nozzle pattern NP with reduced noise. In the present embodiment, the processor 210 (see FIG. 1) generates training image data according to the first program 231.

In S105 of FIG. 4, the processor 210 acquires scanned data of a sheet SH1 (see FIG. 1) by controlling the reading unit 300 to read the sheet SH1. A blank sheet on which the nozzle pattern NP has not been printed but that can be used to print the nozzle pattern NP is used as the sheet SH1. The nozzle pattern NP may be printed on a variety of sheets, including normal and recycled paper. Moreover, the properties of sheets may differ among a plurality of sheets of the same type. For example, sheets among a plurality of sheets of normal paper may have differing brightnesses. In S105 the processor 210 controls the reading unit 300 to read a plurality of sheets having different properties in order to acquire scanned data for a plurality of sheets. In the following description, a scanned image represented by image data will be called a sheet image. The scanned data is used as image data for a background image, as will be described later. The processor 210 stores the scanned data acquired in S105 in the nonvolatile storage device 230.

In S110 the processor 210 selects the type of nozzle pattern NP from "standard" and "nonstandard." "Standard" signifies a nozzle pattern NP configured solely of standard lines, while "nonstandard" denotes a nozzle pattern NP that includes one or more nonstandard lines. Here, the processor 210 selects a type for which processing (the generation of image data) has not been completed, as will be described later. In S120 the processor 210 identifies the selected type. When standard was selected (S120: STANDARD), in S130 the processor 210 executes a process for generating a standard base pattern image (hereinafter called a standard base pattern image generating process), and subsequently advances to S150. If nonstandard was selected (S120: NONSTANDARD), in S140 the processor 210 executes a process for generating a nonstandard base pattern image (hereinafter called a nonstandard base pattern image generating process), and subsequently advances to S150.

Figure 5A:
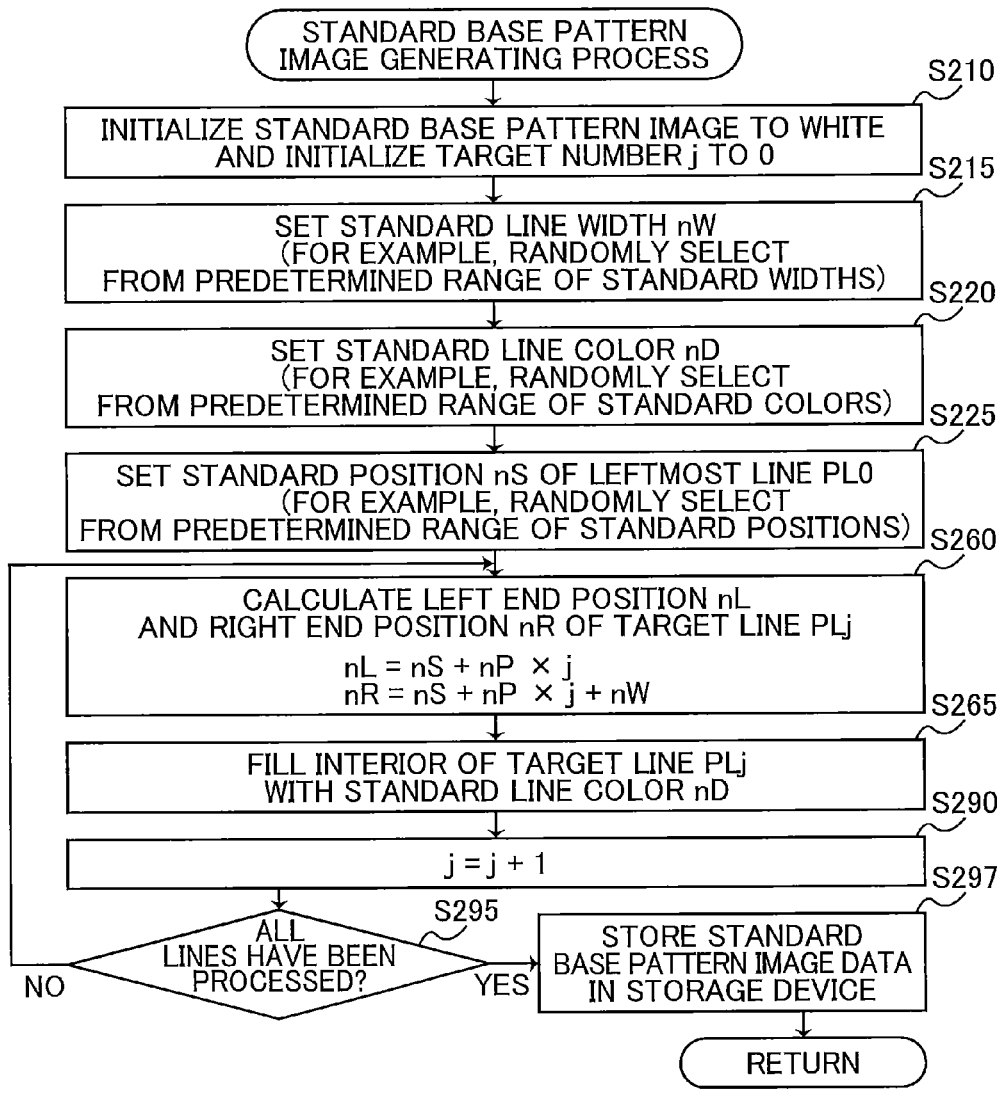
FIG. 5A is a flowchart illustrating steps in a standard base pattern image generating process executed by the processor of the multifunction peripheral according to the first embodiment.
Figure 5B:
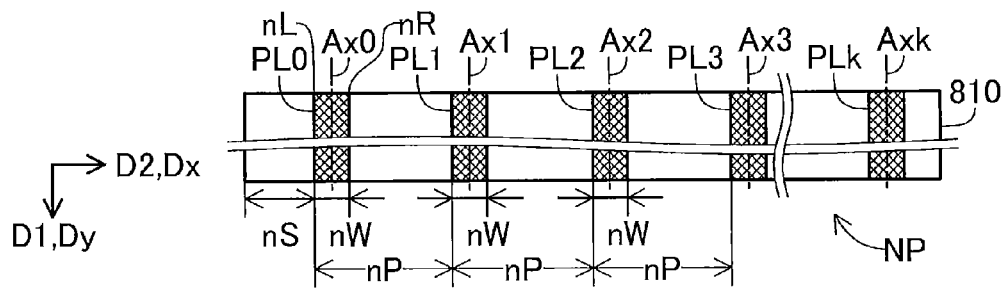
FIG. 5B is an explanatory diagram illustrating an example of a standard base pattern image.

FIG. 5A is a flowchart illustrating steps in the standard base pattern image generating process of S130 in FIG. 4. FIG. 5B is an explanatory diagram illustrating an example of a standard base pattern image 810. The standard base pattern image 810 is an image of a nozzle pattern NP configured solely of standard lines that has the same size as the input image 950$i$ (see FIG. 3). In the example of FIG. 5B, the standard base pattern image 810 includes M number of lines PL0 through PLk. The numbers following the line symbol "PL" identify individual lines PL and are assigned in ascending order along the horizontal direction Dx, from 0 to k (where k=M−1). Center axes Ax0 through Axk are the center axes of the corresponding lines PL0 through PLk. The center axes Ax0 through Axk extend in the vertical direction Dy. The lines PL0 through PLk are rectangular in shape and centered on the corresponding center axes Ax0 through Axk so as to have linear symmetry about the corresponding center axes Ax0 through Axk.

In S210 of FIG. 5A, the processor 210 initializes the luminance values for all pixels in the standard base pattern image 810 to white (255) and initializes a target number j to 0.

In S215 the processor 210 sets a standard line width nW randomly (according to a random number generated) from a predetermined range of standard widths. The range of standard widths is the allowable range of widths for standard lines between a lower limit width greater than zero and an upper limit width. The range of standard widths may be set to the distribution range of the plurality of standard line widths in a plurality of actual input images 950$i$ (see FIG. 3), for example.

In S220 the processor 210 randomly sets a standard line color nD from among a predetermined range of standard colors. The standard color range is an allowable range of colors for standard lines (luminance values in this case) that is between 0 and an upper limit luminance value. The range of standard colors may be set to a distribution range of colors for a plurality of standard lines in a plurality of actual input images 950$i$, for example.

In S225 the processor 210 sets a standard position nS in the horizontal direction Dx of a leftmost line. The leftmost line is the line PL0 (the line identified by the target number j=0) on the left end (i.e., upstream end in the horizontal direction Dx) of the standard base pattern image 810 (see FIG. 5B). In the present embodiment, the standard position nS is randomly selected from a predetermined range of standard positions. The range of standard positions is the allowable range of positions for a standard line between a first position and a second position. The range of standard positions may be set to a distribution range of positions for a plurality of leftmost lines in a plurality of actual input images 950$i$, for example.

In S260 the processor 210 calculates a left end position nL and a right end position nR of a target line PLj identified by the target number j. FIG. 5B indicates the left end position nL and right end position nR for line PL0. The left end position nL is the position of the upstream end in the horizontal direction Dx, and the right end position nR is the position of the downstream end in the horizontal direction Dx. In the present embodiment, M number of lines PL having the standard line width nW are arranged at equal intervals along the horizontal direction Dx. A difference nP of positions in the horizontal direction Dx between two neighboring lines PL is predetermined. Thus, nL=nS+nP×j and nR=nS+nP×j+nW for the target number j.

In S265 the processor 210 fills the interior of the target line PLj in the standard base pattern image 810 with the standard line color nD. Specifically, the processor 210 sets the luminance value for all pixels included in the region from the left end position nL to the right end position nR to the standard line color nD.

In S290 the processor 210 increments the target number j by one. In S295 the processor 210 determines whether all M number of lines PL have been processed. When there remain unprocessed lines PL (S295: NO), the processor 210 returns to S260. After processing all M number of lines PL (S295: YES), in S297 the processor 210 stores standard base pattern image data representing the standard base pattern image in the storage device 215 (the nonvolatile storage device 230, for example). Subsequently, the processor 210 ends the process in FIG. 5A, i.e., the process of S130 in FIG. 4.

Figure 6A:
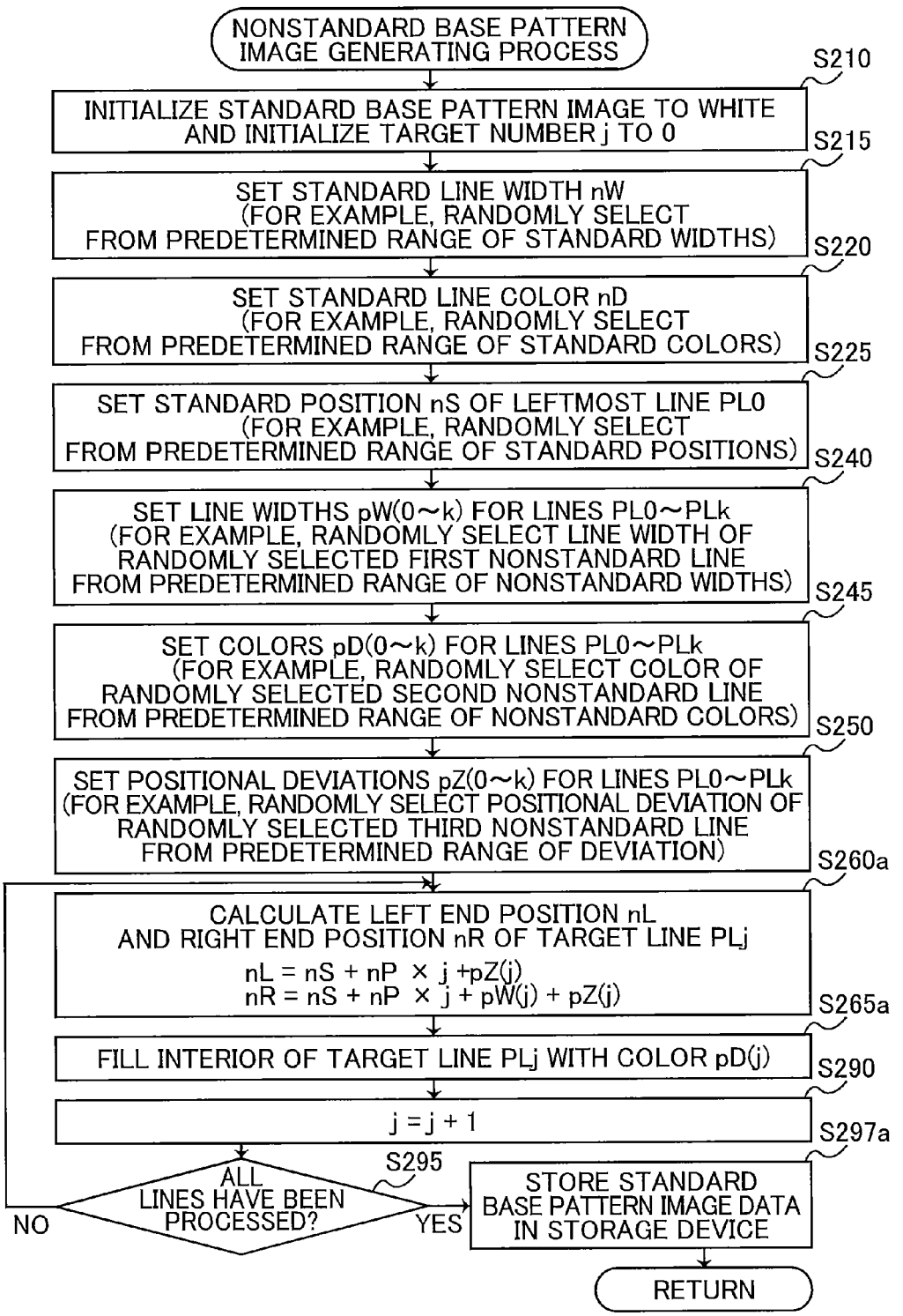
FIG. 6A is a flowchart illustrating steps in a nonstandard base pattern image generating process executed by the processor of the multifunction peripheral according to the first embodiment.
Figure 6B:
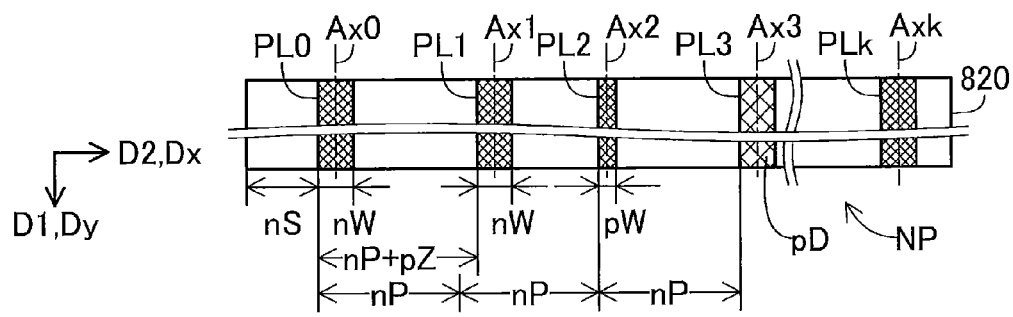
FIG. 6B is an explanatory diagram illustrating an example of a nonstandard base pattern image.

FIG. 6A is a flowchart illustrating steps in the nonstandard base pattern image generating process of S140 in FIG. 4. FIG. 6B is an explanatory diagram illustrating an example of a nonstandard base pattern image 820. The nonstandard base pattern image 820 is an image of a nozzle pattern NP that includes nonstandard lines and has the same size as the input image 950$i$ (see FIG. 3). A plurality of lines in FIG. 6B are assigned the symbols PL0 through PLk, as in FIG. 5B. In the example of FIG. 6B, the three lines PL1, PL2, and PL3 are nonstandard lines (described later in greater detail).

Steps S210, S215, S220, and S225 in FIG. 6A are identical to the same steps in FIG. 5A. In S240 the processor 210 sets a line width pW for each of the M number of lines PL. In the present embodiment, the processor 210 randomly selects a first nonstandard line from the M number of lines PL. In the example illustrated in FIG. 6B, a line PL2 is selected as the first nonstandard line from among the M number of lines PL0 through PLk. The line widths pW of lines not selected as the first nonstandard line are set to the standard line width nW. The line width of the first nonstandard line is randomly selected from a predetermined range of nonstandard widths. The range of nonstandard widths is between zero and a nonstandard upper limit width. A width of zero indicates no line. The nonstandard upper limit width may be equivalent to the upper limit width in the standard width range described in S215 of FIG. 5A. The width pW of the first nonstandard line PL2 in FIG. 6B differs from the standard line width nW.

In S245 the processor 210 sets a color pD (a luminance value in this case) for each of the M number of lines. In the present embodiment, the processor 210 randomly selects a second nonstandard line from the M number of lines. In the example illustrated in FIG. 6B, a line PL3 is selected as the second nonstandard line from among the M number of lines PL0 through PLk. The color pD for lines not selected as the second nonstandard line are set to the standard line color nD. The color pD of the second nonstandard line is randomly selected from a predetermined range of nonstandard colors. The range of nonstandard colors is between 0 and a nonstandard upper limit luminance value. The nonstandard upper limit luminance value may be the same as or greater than the upper limit luminance value for the standard color range described in S220 of FIG. 5A. The color pD of the second nonstandard line PL3 in FIG. 6B differs from the standard line color nD.

In S250 the processor 210 sets a positional deviation pZ in the horizontal direction Dx for each of the M lines. In the present embodiment, the processor 210 randomly selects a third nonstandard line from the M number of lines. In the example illustrated in FIG. 6B, a line PL1 is selected as the third nonstandard line from among the M number of lines PL0 through PLk. The positional deviation pZ for lines not selected as the third nonstandard line is set to zero. The positional deviation pZ for the third nonstandard line is randomly selected from a predetermined range of deviations. The range of deviations is between −XB and +XB. The value XB is predetermined through experimentation. The positional deviation pZ for the third nonstandard line PL1 in FIG. 6B is not zero.

In S260a the processor 210 calculates the left end position nL and right end position nR of the target line PLj identified by the target number j. This step differs from S260 in FIG. 5A in that the line width pW(j) and the positional deviation pZ(j) for the target number j are considered. Specifically, the processor 210 uses the calculations nL=nS+nP×j+pZ(j) and nR=nS+nP×j+pW(j)+pZ(j). In the example of FIG. 6B, as stated above, the position of the third nonstandard line PL1 in the horizontal direction Dx is offset according to the positional deviation pZ. Therefore, the left end portion nL and right end portion nR of the third nonstandard line PL1 are deviated. Further, the width of the first nonstandard line PL2 is set to the width pW, which differs from the standard line width nW. Therefore, the right end position nR of the first nonstandard line PL2 is deviated.

In S265a the processor 210 fills the interior of the target line PLj in the nonstandard base pattern image 820 with the color pD(j) for the target line PLj. Specifically, the luminance value of all pixels in the range from the left end position nL to the right end position nR are set to the color pD(j) for the target line PLj.

Note that nonstandard lines are independently selected in each of steps S240, S245, and S250. Hence, two or more of the three parameters width pW, color pD, and positional deviation pZ for a single nonstandard line may differ from the corresponding parameters of the standard line.

Subsequently, the processor 210 executes the same steps S290 and S295 described in FIG. 5A. When there remain unprocessed lines PL (S295: NO), the processor 210 returns to S260a. When all lines PL have been processed (S295: YES), in S297a the processor 210 stores nonstandard base pattern image data representing the nonstandard base pattern image in the storage device 215 (the nonvolatile storage device 230, for example). Subsequently, the processor 210 ends the process of FIG. 6A, i.e., the process in S140 of FIG. 4.

In S150 of FIG. 4, the processor 210 executes a smoothing process on the base pattern image data generated in S130 or S140 to generate smoothed base pattern image data. The smoothing process is also called a blurring process. Outlines of the nozzle pattern NP are blurred in the actual scanned image of the nozzle pattern NP. In this process, S150 is performed on the base pattern image data so that the base pattern image approximates to the actual scanned image. A mean filter is used in the smoothing process of the present embodiment. The smoothing process may be performed using various other processes, such as a process using a median filter, a Gaussian filter, or another smoothing filter.

Figure 7A:
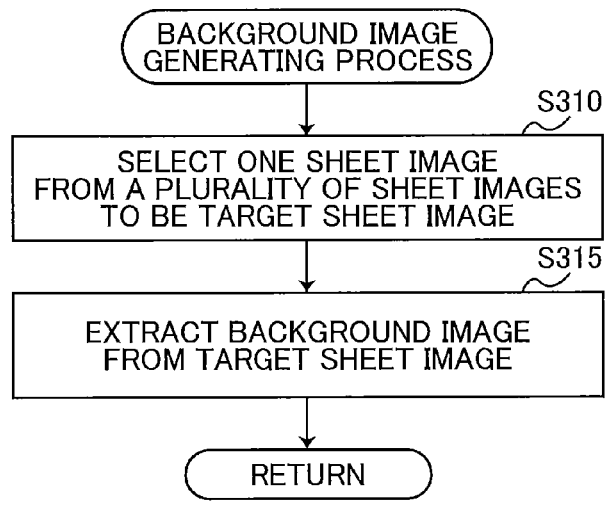
FIG. 7A is a flowchart illustrating steps in a background image generating process executed by the processor of the multifunction peripheral according to the first embodiment.

In S155 the processor 210 executes a process for generating a background image (hereinafter called a background image generating process). FIG. 7A is a flowchart illustrating steps in the background image generating process. In S310 of FIG. 7A, the processor 210 randomly selects one sheet image from a plurality of sheet images for a plurality of sheets (S105 of FIG. 4) to be a target sheet image. In S315 the processor 210 extracts a background image from the target sheet image. The background image is a portion of the target sheet image having the same size as the input image 950i (see FIG. 3). The position of the background image in the target sheet image is set randomly. Hereinafter, the background image extracted from the sheet image will also be called the first background image, and image data for the first background image will be called first background image data.

Figure 7B:
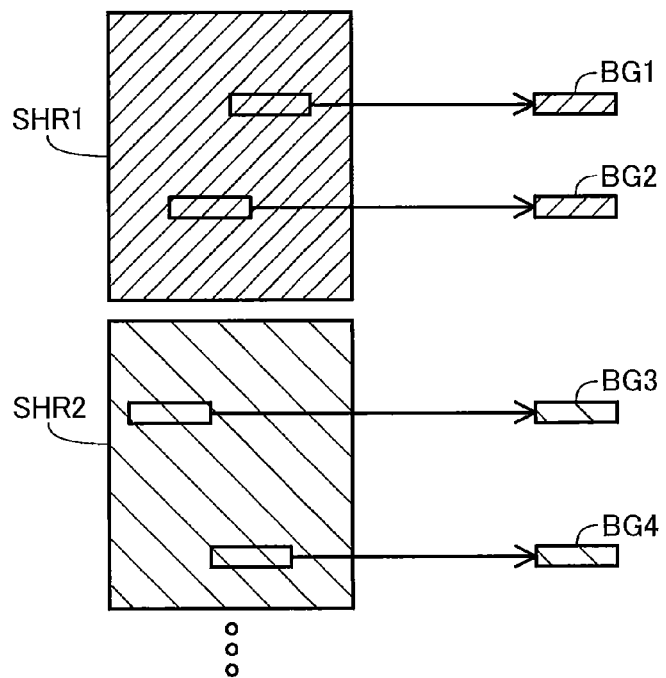
FIG. 7B is an explanatory diagram illustrating an example of a first background image, in which two sheet images and four background images that have been extracted from the sheet images are illustrated.

FIG. 7B is an example of the first background image. The example in FIG. 7B indicates two sheet images SHR1 and SHR2, and background images BG1 through BG4 that have been extracted from the sheet images SHR1 and SHR2. One background image is extracted through each execution of the process in FIG. 7A.

In S160 of FIG. 4, the processor 210 generates noisy pattern image data representing a noisy pattern image. The noisy pattern image is generated using the base pattern image generated in S130 or S140 and the first background image. FIGS. 8A through 8D are explanatory diagrams of noisy pattern images. FIG. 8A illustrates a noisy standard pattern image 850a generated from a standard base pattern image 810a and a first background image 830a. FIGS. 8B and 8C respectively illustrate noisy nonstandard pattern images 850b and 850c generated from respective nonstandard base pattern images 820b and 820c and respective first background images 830b and 830c. A luminance value Pt(x, y) in the drawings denotes the luminance value of a pixel (x, y) in the corresponding base pattern images, i.e., the standard base pattern image 810a and the nonstandard base pattern images 820b and 820c (hereinafter called a base pattern luminance value Pt). The value x denotes the pixel position in the image relative to the horizontal direction Dx, and the value y denotes the pixel position in the image relative to the vertical direction Dy. For luminance values Pu and Pn of other images, (x, y) indicates the position of a pixel in the image. The luminance value Pu is the luminance value of a pixel in the first background images 830a through 830c (hereinafter called the first background luminance value Pu). The luminance value Pn is a luminance value of a pixel in the noisy pattern images, i.e., the noisy standard pattern image 850a and the noisy nonstandard pattern images 850b and 850c (hereinafter called the first target luminance value Pn).

FIG. 8D shows a formula for calculating the first target luminance value Pn. When the base pattern luminance value Pt(x, y) is 255, i.e., when pixel (x, y) represents the background and not a line PL, the first target luminance value Pn(x, y) is set to the same value as the first background luminance value Pu(x, y). In other words, the weight of the first background luminance value Pu is one and the weight of the base pattern luminance value Pt is zero.

When the base pattern luminance value Pt(x, y) is less than 255, i.e., when the pixel (x, y) represents a line PL and not the background, Pn(x, y) is set to k1×Pu(x, y)+k2×Pt(x, y). Weights k1 and k2 are both greater than zero. In the present embodiment, k1+k2=1. For example, k1=0.75 and k2=0.25.

The processor 210 sets the luminance value for each pixel in the noisy pattern image according to the formula in FIG. 8D. To calculate the first target luminance value Pn of pixels representing a line PL, the first background luminance value Pu is used in addition to the base pattern luminance value Pt. Accordingly, the noisy pattern image can suitably reproduce the sheet image, i.e., the scanned image of a sheet on which the base pattern image was printed.

In S165 of FIG. 4, the processor 210 stores the noisy pattern image data generated in S160 in the storage device 215 (the nonvolatile storage device 230 in the present embodiment).

In S170 the processor 210 identifies a representative color value in the first background image generated in S155. In the present embodiment, the processor 210 calculates the representative value to be the average luminance value of all pixels in the first background image.

In S175 the processor 210 generates reduced-noise pattern image data representing a reduced-noise pattern image. The reduced-noise pattern image is generated using the base pattern image generated in S130 or S140 and a second background image represented by the representative color value identified in S170. FIGS. 9A through 9D are explanatory diagrams for reduced-noise pattern images. FIG. 9A illustrates a reduced-noise standard pattern image 851a generated from the standard base pattern image 810a and a second background image 830am. FIGS. 9B and 9C illustrate respective reduced-noise nonstandard pattern images 851b and 851c generated from the respective nonstandard base pattern images 820b and 820c and respective second background images 830bm and 830cm. The color values of all pixels in the second background images 830am through 830cm are set to the representative color value. A second background luminance value Pum(x, y) is the luminance value of a pixel (x, y) in the second background images 830am through 830cm and is equivalent to the representative color value. A luminance value Pc(x, y) is the luminance value of a pixel (x, y) in the reduced-noise pattern images, i.e., the reduced-noise standard pattern image 851a and the reduced-noise nonstandard pattern images 851b and 851c (hereinafter called a second target luminance value Pc).

FIG. 9D shows a formula for calculating the second target luminance value Pc. When the base pattern luminance value Pt(x, y) is 255, i.e., when the pixel (x, y) represents the background and not a line PL, the second target luminance value Pc(x, y) is set to the same value as the second background luminance value Pum(x, y), i.e., the representative color value (the average value of first background luminance values Pu in the present embodiment). Thus, the weight of the second background luminance value Pum is one and the weight of the base pattern luminance value Pt is zero.

When the base pattern luminance value Pt(x, y) is smaller than 255, i.e., when the pixel (x, y) represents a line PL and not the background, the second target luminance value Pc(x, y) is set to k1×Pum(x, y)+k2×Pt(x, y). The weight k1 of the second background luminance value Pum is equivalent to the weight k1 of the first background luminance value Pu in FIG. 8D. The weight k2 of the base pattern luminance value Pt is equivalent to the weight k2 of the base pattern luminance value Pt in FIG. 8D.

The processor 210 sets the luminance value for each pixel in the reduced-noise pattern image according to the formula in FIG. 9D. To calculate the second target luminance value Pc of pixels representing a line PL, the second background luminance value Pum (i.e., the representative color value) is used in addition to the base pattern luminance value Pt. Accordingly, the reduced-noise pattern image can suitably represent an image formed by reducing noise (fiber patterns in the sheet, for example) in the sheet image, i.e., the scanned image of a sheet on which the base pattern image was printed.

In S180 of FIG. 4, the processor 210 executes a contrast enhancement process on the reduced-noise pattern image data. FIG. 9E is a graph showing an example of the contrast enhancement process, where the horizontal axis represents the pre-adjusted second target luminance value Pc and the vertical axis represents an adjusted second target luminance value Pcc. The correlations in the graph are configured such that the adjusted second target luminance value Pcc changes from 0 to 255 as the pre-adjusted second target luminance value Pc changes from a first threshold Va to a second threshold Vb (0<Va<Vb<255). The adjusted second target luminance value Pcc is set to 0 when Pc<Va and is set to 255 when Vb<Pc. Note that various other processes for enhancing contrast may be executed in place of the process based on the correlations in FIG. 9E.

FIGS. 9A through 9C illustrate enhanced-contrast reduced-noise pattern images 860a through 860c. Owing to this enhanced contrast, the lines PL and background can be easily distinguished from each other. Image data representing the enhanced-contrast reduced-noise pattern images 860a through 860c will be called adjusted reduced-noise pattern image data.

In S185 of FIG. 4, the processor 210 stores the adjusted (i.e., enhanced-contrast) reduced-noise pattern image data in the storage device 215 (the nonvolatile storage device 230 in the present embodiment) in association with the noisy pattern image data.

In S190 the processor 210 determines whether the generation of image data is complete. In the present embodiment, the condition for completion requires that the number of times image data has been generated for a standard nozzle pattern NP be greater than or equal to a predetermined standard number P (where P is an integer greater than or equal to two) and that the number of times image data has been generated for a nonstandard nozzle pattern NP be greater than or equal to a predetermined nonstandard number Q (where Q is an integer greater than or equal to two). Note that other conditions for completion may be used.

When the generation of image data is not complete (S190: NO), the processor 210 returns to S110. When the processor 210 determines that the generation of image data is complete (S190: YES), the processor 210 ends the process of FIG. 4. At this time, a plurality of sets of noisy pattern image data and adjusted reduced-noise pattern image data is stored in the nonvolatile storage device 230.

As described above, noisy pattern image data is generated in S155 and S160 of FIG. 4 in the training image data generating process according to the present embodiment. As described with reference to FIGS. 8A through 8C, the noisy pattern images 850a through 850c are formed by arranging the nozzle pattern NP (a plurality of lines PL) on the corresponding first background images 830a through 830c. As described in S160, a noisy pattern image is generated using the first background image and the base pattern image. As described in S105 and S155, the first background image is at least a portion of the scanned image (i.e., the sheet image) acquired by optically reading the sheet SH1 to be used for printing. As described in S130 and S140, the base pattern image is an image of the nozzle pattern NP. In S165 the noisy pattern image data is stored in the storage device 215.

As described in FIG. 8D, the process for setting color values (luminance values in this case) for pixels in the noisy pattern image includes two processes. The first process is performed for cases in which the target pixel represents the nozzle pattern NP (see the bottom line of FIG. 8D). In the first process, the luminance value (first target luminance value) Pn(x, y) for the target pixel (x, y) is set to the weighted sum of the first background luminance value Pu(x, y) and the base pattern luminance value Pt(x,y) for the target pixel (x, y). The weight k1 multiplied by the first background luminance value Pu is greater than zero, and the weight k2 multiplied by the base pattern luminance value Pt is greater than zero. The second process is performed for cases in which the target pixel represents a portion where the nozzle pattern NP is not present (see the top line of FIG. 8D). In the second process, the luminance value (first target luminance value) Pn(x, y) for the target pixel (x, y) is set to a value acquired by multiplying a weight larger than the weight k1 of the first background luminance value Pu used in the first process (one in the present embodiment) by the first background luminance value Pu(x, y) for the target pixel (x, y). Through the above processes, the noisy pattern image can suitably reproduce the image obtained by optically reading a sheet on which the nozzle pattern NP was printed. The learning model 235 is used to process actual image data acquired by optically reading a sheet on which the nozzle pattern NP was printed. The process according to the embodiment illustrated in FIG. 4 can suitably generate training image data for training this type of learning model 235.

In S170 the processor 210 identifies a representative color value that represents a plurality of luminance values associated with a plurality of positions in the background image that was generated in S155. In S175 the processor 210 generates reduced-noise pattern image data and in S180 adjusts the contrast of the reduced-noise pattern image data. As described with reference to FIGS. 9A through 9C, the reduced-noise pattern images 851a through 851c are images formed by arranging the nozzle pattern NP (a plurality of lines PL) over the corresponding second background images 830am through 830cm. As described in S175, a reduced-noise pattern image is generated using a second background image and the base pattern image. As described in S170 and S175, the second background image is an image represented by the representative color value. In S185 the reduced-noise pattern image data adjusted in S180 is stored in the storage device 215.

As described in FIG. 9D, the process for setting color values (luminance values in this case) for pixels in the reduced-noise pattern image includes two processes. The first process is performed for cases in which the target pixel represents the nozzle pattern NP (see the bottom line of FIG. 9D). In the first process, the luminance value (second target luminance value) Pc(x, y) for the target pixel (x, y) is set to the weighted sum of the second background luminance value Pum(x, y) and the base pattern luminance value Pt(x, y) for the target pixel (x, y). The weight k1 multiplied by the second background luminance value Pum is greater than zero, and the weight k2 multiplied by the base pattern luminance value Pt is greater than zero. The second process is performed for cases in which the target pixel represents a portion where the nozzle pattern NP is not present (see the top line of FIG. 9D). In the second process, the luminance value (second target luminance value) Pc(x, y) for the target pixel (x, y) is set to a value obtained by multiplying a weight larger than the weight k1 of the second background luminance value Pum used in the first process (one in the present embodiment) by the second background luminance value Pum(x, y) for the target pixel (x, y). Through the above processes, the reduced-noise pattern image can suitably represent an image obtained by reducing noise in a noisy pattern image. The process according to the embodiment in FIG. 4 can suitably generate training image data for training using an image that includes noise and an image with reduced noise.

As described in S170, the representative color value in the present embodiment is the average value of a plurality of color values for a plurality of pixels in the first background image. Hence, since the second background image can suitably represent a background image whose noise has been reduced in comparison to the first background image, this process can generate suitable pattern image data with reduced noise. Note that the representative color value is not limited to an average value but may be any of various values identified using a plurality of color values, such as the median or mode. Further, the representative color value may be identified using some of a plurality of pixels selected from uniformly distributed positions in the first background image rather than all pixels in the first background image.

As described with reference to FIG. 5B and the like, the nozzle pattern NP includes M number of lines PL aligned in the first direction D1 and juxtaposed in the second direction D2 orthogonal to the first direction D1 (where M is an integer greater than or equal to two). Thus, the present embodiment can suitably generate training image data for this type of nozzle pattern NP.

As described in S190, a noisy pattern image and a reduced-noise pattern image for nonstandard nozzle pattern NP are generated Q number of times (where Q is an integer greater than or equal to two). As described in FIG. 6A, the standard line width nW, standard line color nD, standard position nS, and positional deviation pZ of zero are associated with a standard line included in the noisy pattern image. The standard line width nW, standard line color nD, and standard position nS are associated with the noisy pattern image and are set for each noisy pattern image. As indicated in S260a of FIG. 6A, the position of the standard line in the horizontal direction Dx is set according to the standard position nS and the target number j (i.e., the number of the line PL in the horizontal direction Dx). As described with reference to FIGS. 6A, 6B, and the like, each of the Q number of noisy pattern images includes one or more nonstandard lines. A nonstandard line has one or more of the following three parameter values: (1) a color pD (luminance in this case) that differs from the standard line color nD; (2) a position that differs from the standard position in the horizontal direction Dx corresponding to the standard position nS and target number j; and (3) a width pW that differs from the standard line width nW. Accordingly, the third embodiment can suitably generate training data for training the learning model 235, which is used to process images of nozzle patterns having defects, such as those illustrated in FIG. 2B.

Through the process in FIG. 6A, the Q number of noisy nonstandard pattern images include the following three types of noisy pattern images: (1) a noisy pattern image that includes one or more nonstandard lines having a color pD (luminance in this case) that differs from the standard line color nD; (2) a noisy pattern image that includes one or more nonstandard lines arranged at different positions from the standard positions in the horizontal direction Dx; and (3) a noisy pattern image that includes one or more nonstandard lines having a width pW that differs from the standard line width nW. Hence, suitable training image data can be generated for use in training when the luminance, position in the horizontal direction Dx, and width may be distorted. For example, the noisy nonstandard pattern image 850b in FIG. 8B may include one or more nonstandard lines having a color pD that differs from the standard line color nD, and one or more nonstandard lines arranged at positions in the horizontal direction Dx differing from the standard positions. The noisy nonstandard pattern image 850c in FIG. 8C may include one or more nonstandard lines having a width pW that differs from the standard line width nW. In this way, a single noisy pattern image may include a plurality of types of nonstandard lines.

In the process of FIG. 6A, nonstandard lines are randomly selected for each noisy pattern image. Therefore, the total number of nonstandard lines may differ between a plurality of noisy nonstandard pattern images. Hence, training image data can be suitably generated when the total number of nonstandard lines included in the nozzle pattern NP can vary. For example, the total number of nonstandard lines may be different between the noisy nonstandard pattern image 850b in FIG. 8B and the noisy nonstandard pattern image 850c in FIG. 8C.

A3. Training Process

FIGS. 10A through 10C are explanatory diagrams describing a training process for the learning model 235. FIG. 10A is a flowchart illustrating steps in a sample training process for the learning model 235. In the present embodiment, the learning model 234 is trained so that, when image data of a nozzle pattern NP is inputted therein, the learning model 235 generates image data for the same nozzle pattern NP but with reduced noise. This training adjusts the (Fx×Fy) number of individual weights in the filter FL (see FIG. 3). Below, the training process executed by the multifunction peripheral 200 (see FIG. 1) will be described. The processor 210 performs training according to the second program 232. Note that training may be executed by another data processing device having a high computing power.

In S310 of FIG. 10A, the processor 210 initializes a plurality of operation parameters for the learning model 235 (the (Fx×Fy) number of weights in the filter FL in this case). For example, each of the operation parameters is set to a random number.

In S315 the processor 210 selects V number of sets of noisy pattern image data (where V is an integer greater than or equal to one) from the plurality of sets of noisy pattern image data, inputs the V number of sets of data into the learning model 235, and generates V number of sets of output image data. Here, unused sets of noisy pattern image data may be selected from the plurality of sets of noisy pattern image data as the V number of sets of noisy pattern image data. Additionally, the V number of sets of noisy pattern image data may be randomly selected from the plurality of sets of data.

In S320 the processor 210 calculates an error value for each of the V number of sets of noisy pattern image data inputted into the learning model 235. The error value is an evaluation value on the difference between the adjusted reduced-noise pattern image data and the output image data. The error value is calculated according to a predetermined loss function. FIG. 10B is an explanatory diagram showing a sample loss function. In the present embodiment, a loss function LF is the sum of a first term Limg and a second term Lfilter.

The first term Limg denotes the difference between the adjusted reduced-noise pattern image and the output image represented by output image data. In the present embodiment, the first term Limg is the root-mean-square error normalized to a value between 0 and 255. The pixel number IW in the first term Limg in FIG. 10B denotes the number of pixels in the horizontal direction Dx of each image, while the pixel number IH denotes the number of pixels in the vertical direction Dy of each image (see FIG. 3). A pixel value Po(x, y) denotes the value of a pixel (x, y) in the output image, where the value of x indicates the position of the pixel in the image relative to the horizontal direction Dx and the value y indicates the position of the pixel in the image relative to the vertical direction Dy. The pixel value Pcc(x, y) denotes the value of the pixel (x, y) in the adjusted reduced-noise pattern image (see FIGS. 9A through 9C). The first term Limg becomes smaller as the difference between the adjusted reduced-noise pattern image and the output image grows smaller. Note that the first term Limg may be expressed by various functions that calculate a smaller value as the difference between two images grows smaller.

The second term Lfilter is an evaluation value indicating the degree of symmetry of weights W in the filter FL. FIG. 10C is an explanatory diagram of the second term Lfilter. This diagram illustrates a filter FL and a filter axis of symmetry AxF. The filter axis of symmetry AxF is parallel to the axis of symmetry in each line PL (the center axis AxP and center axes Ax0 through Axk, for example) in the nozzle pattern NP (see FIGS. 2A, 5B, 6B, etc.). In the present embodiment, the filter axis of symmetry AxF is aligned in the first direction D1 (i.e., the vertical direction Dy). The filter axis of symmetry AxF also passes through the center of the filter FL in the second direction (i.e., the horizontal direction Dx). Since the horizontal size Fx of the filter FL is five which is an odd number in the present embodiment, the filter axis of symmetry AxF overlaps weights W(3, 1) through W(3, 5) in the third column.

The second term Lfilter is the average of the absolute values of the differences between two weights W arranged at symmetrical positions about the filter axis of symmetry AxF.

Symmetrical pairs PW1 and PW2 in FIG. 10C are examples of two weights W arranged at symmetrical positions. The first pair PW1 is configured of weights W(1, 2) and W(5, 2). The second pair PW2 is configured of weights W(2, 4) and W(4, 4).

In the formula for the second term Lfilter shown in FIG. 10B, the lower bounds and upper bounds of the indices i and j in the summation notation are set such that all weights on the left side of the filter axis of symmetry AxF are selected. In the example of the embodiment, ten weights W(1, 1) through W(1, 5) and W(2, 1) through W(2, 5) are selected. The variable added through the summation notation is the absolute value of the difference between symmetrical weight pair (W(i, j) and W(Fx+1−i, j)) identified by the indices i and j.

The second term Lfilter grows smaller as the symmetry of the plurality of weights W about the filter axis of symmetry AxF increases. A second term. Lfilter of this type is included in the loss function LF in order to suppress distortion (positional deviation, for example) in the line PL caused by image processing using the filter FL.

Figure 11A:
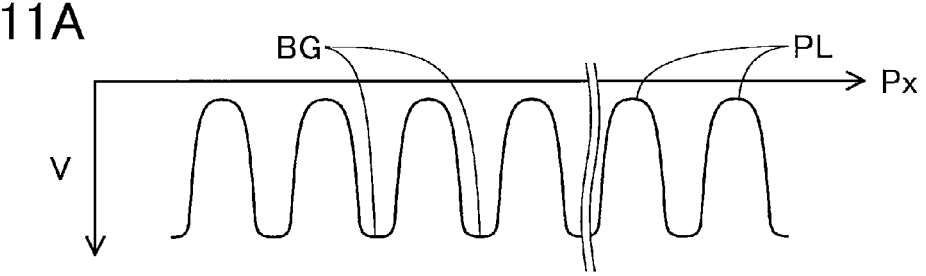
FIG. 11A is a graph showing luminance values in an image of a nozzle patter, specially illustrating a distribution of luminance values along a single pixel line extending in a horizontal direction, where the horizontal axis represents a position in a horizontal direction and the vertical axis represents the luminance value.

FIGS. 11A through 11D are explanatory diagrams illustrating the positions of lines PL. FIG. 11A is a graph showing the luminance values in an image of the nozzle pattern NP, where the horizontal axis represents a position Px in the horizontal direction Dx and the vertical axis represents the luminance value V. This graph illustrates the distribution of luminance values V along a single pixel line extending in the horizontal direction Dx. The direction of the vertical axis is downward. Hence, the luminance value V is smaller in the upper portion of the graph and larger in the lower portion of the graph. Each peak in the graph represents a single line PL, and each valley represents a background area BG. The variables for the vertical and horizontal axes are common for all graphs in FIGS. 11A through 11D.

Figure 11B:
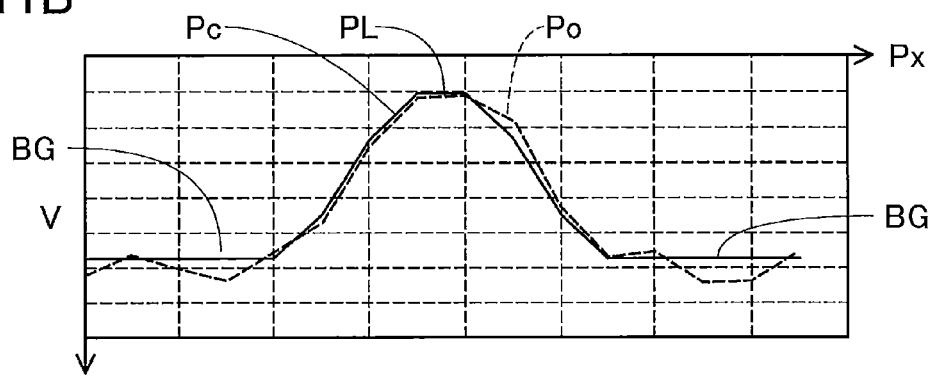
FIG. 11B is a graph showing luminance values representing a single line in the nozzle patter, in which a dashed graph line represents luminance values of an output image generated by the learning model prior to completion of training, and a solid graph line represents the luminance values in the reduced-noise pattern image.

FIG. 11B is a graph of luminance values representing a single line PL. The dashed graph line indicates a luminance value Po of the output image generated by the learning model 235, and the solid graph line represents a luminance value Pc in a reduced-noise pattern image. FIG. 11B indicates the luminance value Po outputted by the learning model 235 prior to completion of training. As with the pixel value Po(x, y) for the output image described in FIG. 10B, the luminance value Po indicates the luminance value at each pixel position in the output image. As with the luminance value Pc(x, y) described in FIG. 9A and the like, the luminance value Pc indicates the luminance value at each pixel position in the reduced-noise pattern image. As shown in FIG. 11B, a difference is produced between these luminance values Po and Pc. Training in the present embodiment reduces the difference between the luminance values Po and Pcc rather than the difference between the luminance values Po and Pc. (As with the pixel value Pcc described in FIG. 10B and the like, the luminance value Pcc indicates the luminance value at each pixel position in the adjusted reduced-noise pattern image.) However, to simplify the description, this description will assume that training reduces the difference between the luminance values Po and Pc.

Figure 11C:
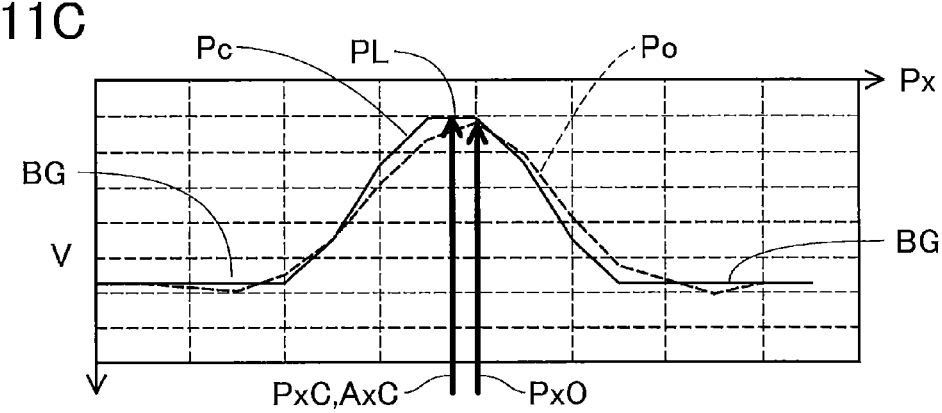
FIG. 11C is a graph showing a reference case, in which a dashed graph line represents luminance values of an output image if the loss function shown in FIG. 10B were configured only of the first term, and a solid graph line represents the luminance values in the reduced-noise pattern image.

FIG. 11C is a graph illustrating a reference case. This graph indicates the luminance values Po and Pc if the loss function LF were configured only of the first term Limg. The luminance value Po is the luminance value outputted by the learning model 235 after training. A first peak position PxC in FIG. 11C denotes the position of a peak in the line PL represented by the luminance values Pc in the reduced-noise pattern image. This first peak position PxC is equivalent to the position of the axis of symmetry for the line PL and is identical to the peak position of the line PL in the noisy pattern image inputted into the learning model 235. Hereinafter, the first peak position PxC will also be called the axis of symmetry AxC.

A second peak position PxO in FIG. 11 indicates the position of a peak in the line PL represented by the luminance values Po in the output image. The second peak position PxO deviates from the first peak position PxC for the following reason. During training using the first term Limg, the filter FL is adjusted to reduce the error value calculated according to the first term Limg without discriminating between the line PL and background area BG. As a result, in order to reduce the large difference with the background area BG (see FIG. 11B), the adjusted filter FL may adjust the difference between the luminance values Po and Pc in areas representing the line PL (see FIG. 11C) asymmetrically to the axis of symmetry AxC of the line PL, thereby distorting the line PL in the output image. For example, the second peak position PxO in the line PL of the output image may deviate from the original first peak position PxC. If this output image were used, a large error would be identified at the position of the line PL in the output image.

Figure 11D:
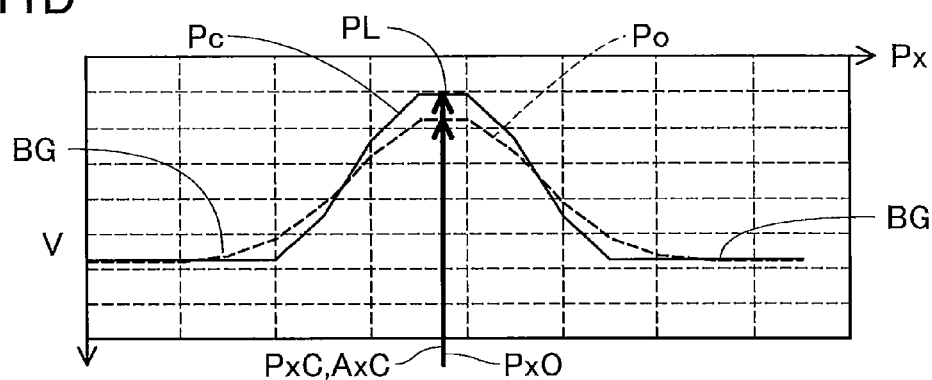
FIG. 11D is a graph showing the first embodiment, in which a dashed graph line represents luminance values of an output image generated by the learning model after training, and a solid graph line represents the luminance value in the reduced-noise pattern image.

FIG. 11D is an explanatory diagram for the present embodiment. The luminance value Po in this graph is the luminance value outputted by the learning model 235 after training. As shown in the graph, the peak position PxO of the line PL represented by the luminance value Po in the output image is approximately equivalent to the original peak position PxC for the following reason. The loss function LF (see FIG. 10B) includes the second term Lfilter in addition to the first term Limg. The value of the second term. Lfilter increases as the symmetry of weights W in the filter FL decreases. Through operations with the convolutional layer 310 (see FIG. 3), the filter FL is applied to a plurality of positions distributed uniformly through the input image (all pixel positions in the input image in the present embodiment). In other words, the filter FL is applied to a plurality of positions overlapping one line PL that have linear symmetry to the axis of symmetry AxC of the line PL. Hence, if the filter FL were to adjust the difference between the luminance values Po and Pc asymmetrically relative to the axis of symmetry AxC of the line PL, as in the example of FIG. 11C, symmetry of the weights W relative to the filter axis of symmetry AxF (see FIG. 10C) would be low. As a result, although the value of the first term Limg can be decreased, the value of the second term Lfilter would increase, causing an increase in the error values based on the loss function LF.

When weights W in the filter FL are adjusted to reduce error values based on the loss function LF (see FIG. 10B), symmetry of weights W relative to the filter axis of symmetry AxF (see FIG. 10C) is increased. Therefore, the adjusted filter FL adjusts the difference between the luminance values Po and Pee symmetrically relative to the axis of symmetry AxC of the line PL, thereby suppressing deviations between the second peak position PxO in the line PL of the output image and the original peak position PxC.

In S325 of FIG. 10A, the processor 210 uses the V number of error values based on this loss function LF to adjust the plurality of operation parameters in the learning model 235 (the weights W of the filter FL in the present embodiment). Specifically, the processor 210 adjusts the plurality of operation parameters according to a predetermined algorithm in order to reduce the error values. For example, the algorithm may be one using a backpropagation method and a gradient descent method.

In S330 the processor 210 determines whether training is complete. Training is determined to be complete on the condition that all error values calculated in S320 are smaller than a predetermined error threshold, for example. Alternatively, training may be determined to be complete on the condition that the process in S315 through S325 has been executed at least a predetermined count threshold.

If the processor 210 determines that training is not complete (S330: NO), the processor 210 returns to S315. When determining that training is complete (S330: YES), in S335 the processor 210 extracts data for the filter FL from the learning model 235 (i.e., data on the (Fx×Fy) number of weights W). In S340 the processor 210 stores filter data FLD representing the data for the filter FL in the storage device 215 (the nonvolatile storage device 230 in the present embodiment), and subsequently ends the process of FIG. 10A.

A4. Image Process

FIG. 12 is a flowchart illustrating steps in an image process using the filter data FLD (see FIG. 1). In this image process, a filtering process using the filter FL is performed on scanned data for the sheet SH2 on which the nozzle pattern NP has been printed. The image process is performed to check for defects in nozzles Nz of the print head 110. The process of FIG. 12 may be performed when manufacturing the printing device 100, for example. In the present embodiment, the processor 210 of the multifunction peripheral 200 executes the image process according to the third program 233.

In S410 of the image process, the printing device 100 prints the nozzle pattern NP on the sheet SH2. For example, an operator performs operations on the printing device 100 for controlling the printing device 100 to print the nozzle pattern NP. Alternatively, the printing device 100 may be connected to the multifunction peripheral 200, and the processor 210 may issue a print command to the printing device 100.

In S420 the sheet SH2 on which the nozzle pattern NP has been printed is optically read by the reading unit 300 to generate scanned data. In S430 the processor 210 acquires the scanned data from the reading unit 300 and executes a cropping process on the scanned data to cut out the portion of the data representing the nozzle pattern NP. In this way, the processor 210 obtains the target data. The portion of the scanned image that is cut out is predetermined. Note that the cropping process may be omitted, and the scanned data may be used as the target data as is.

In S440 the processor 210 executes a filtering process on the target data using the filter FL to generate processed image data. The filtering process is identical to the convolution process performed by the convolutional layer 310 (see FIG. 3). The processed image represented by the processed image data represents an undistorted nozzle pattern NP that is identical to the nozzle pattern NP in the target data. Thus, this process reduces noise and enhances contrast in the processed image.

In S450 the processor 210 stores the processed image data in the storage device 215 (the nonvolatile storage device 230 in the present embodiment). In S460 the processor 210 analyzes the processed image data to determine whether the nozzle pattern NP in the processed image has defects. For example, the processor 210 detects a plurality of lines PL in the processed image according to a well-known line detection method (edge extraction and Hough transform, for example). The processor 210 identifies the width, luminance value, and position in the horizontal direction Dx of each line PL by analyzing the plurality of detected lines PL. If even one parameter from among the position, width, and luminance value for one target line falls outside an allowable range for that parameter, the processor 210 determines that the target line has a defect. However, if all parameters for position, width, and luminance value are within the allowable ranges for the target line, the processor 210 determines that the target line has no defects. In S470 the processor 210 stores data indicating these determination results in the storage device 215 (the nonvolatile storage device 230 in this example), and subsequently ends the process of FIG. 12.

As described above, a filter FL for image processing is generated in the process of FIG. 10A. In S315 the processor 210 generates output image data by inputting noisy pattern image data into the learning model 235. As described in FIG. 3, the learning model 235 is a neural network based model configured of a single convolutional layer 310. The filter FL (convolution filter FL) has a weight W for each pixel within a filter region, which is the region of the inputted image corresponding to the filter FL. The convolutional layer 310 performs convolution using the filter FL. In S320 of FIG. 10A, the processor 210 uses the output image data and reduced-noise pattern image data to calculate error values based on the loss function LF. In S325 the processor 210 adjusts the weights W in the filter FL to reduce these error values. In S335 the processor 210 extracts filter data FLD from the filter FL indicating the adjusted weights W as filter data for image processing. As illustrated in FIGS. 8A through 8C, the noisy pattern images 850a through 850c are images including noise and reproduce the nozzle pattern NP that includes lines PL. As described in FIG. 5B, the lines PL0 through PLk have symmetric shapes relative to their corresponding center axes Ax0 through Axk. As described in FIG. 9A through 9C, the enhanced-contrast reduced-noise pattern images 860a through 860c are images of the nozzle pattern NP having reduced noise compared to the noisy pattern images 850a through 850c. The enhanced-contrast reduced-noise pattern images 860a through 860c represent the same nozzle pattern NP as the nozzle pattern NP in the noisy pattern images 850a through 850c. As shown in FIG. 10B, the loss function LF includes the first term Limg and the second term Lfilter. The first term. Limg specifies the magnitude of difference between the output image data and the reduced-noise pattern image data. The second term Lfilter grows smaller as symmetry of the weights W relative to the filter axis of symmetry AxF in the filter FL (see FIG. 10C) increases. The filter axis of symmetry AxF is parallel to the center axes Ax0 through Axk of the corresponding lines PL0 through PLk. Accordingly, an image process performed on an image of the nozzle pattern NP using the filter FL can reduce noise and suppress distortion in the nozzle pattern NP caused by image processing. Specifically, this process suppresses changes in the positions of lines PL, as described with reference to FIGS. 11A through 11D.

Both image data for standard nozzle patterns NP and image data for nonstandard nozzle patterns NP are used in training. Accordingly, the learning model 235 (and thus the filter FL) can generate an output image of the same undistorted nozzle pattern NP, irrespective of whether the nozzle pattern NP in the scanned image includes nonstandard lines.

As described in S180 and S185 of FIG. 4 and in FIGS. 9A through 9C, the enhanced-contrast reduced-noise pattern images 860a through 860c used for calculating error values have more enhanced contrast than the noisy pattern images

850*a* through 850*c* (see FIGS. 8A through 8C). Therefore, an image process using the filter FL can enhance contrast.

As described in FIGS. 10B and 10C, the second term Lfilter is smaller for a smaller difference between two weights arranged in the filter FL at symmetric positions about the filter axis of symmetry AxF. Thus, the second term Lfilter can suitably suppress distortion (positional deviation, for example) of lines PL caused by image processing with the filter FL.

In S410 of FIG. 12, the printing device 100 prints the nozzle pattern NP on the sheet SH2. The printing device 100 is provided with the print head 110 (see FIGS. 2A and 2B). The print head 110 has a plurality of nozzles Nz configured to eject ink. The nozzle pattern NP includes a plurality of lines PL that are parallel to each other. Each line PL has a symmetric shape relative to a corresponding center axis AxP. One line PL is printed by a single nozzle Nz. In S420 of FIG. 12, the reading unit 300 optically reads the nozzle pattern NP and generates scanned data for an image of the nozzle pattern NP. In S430 the processor 210 uses the scanned data to acquire target data, i.e., image data of the nozzle pattern NP. In S440 the processor 210 executes an image process on the target data using the filter FL to generate processed image data. In S450 the processor 210 stores the processed image data in the storage device 215. This process reduces noise and suppresses distortion of lines PL in the nozzle pattern NP featured in an image represented by the processed image data. Hence, the processed image data can be used to reliably identify the condition of the nozzles Nz. In this way, the image process using the filter FL can improve the quality of scanned data generated by the reading unit 300, and particularly the quality of a scanned image of the nozzle pattern NP that has been printed by the printing device 100. As described in FIGS. 2A and 2B, the nozzle pattern NP can be used to check the quality of the nozzles Nz (see FIG. 2A). The nozzle pattern NP can be printed and visually inspected when manufacturing the printing device 100, for example. Here, the method employed for reducing manufacturing costs may comprise printing the nozzle pattern NP at low density using inexpensive ink, reading the printed nozzle pattern NP with the reading unit 300, and determining the quality of the nozzle pattern NP (i.e., the quality of the nozzles Nz) by performing an image process on the scanned image. However, since the color of the nozzle pattern NP is light when printed at low density, distinguishing the nozzle pattern NP from the background in the scanned image may be difficult. Here, brightness correction can be performed on the scanned image to enhance the nozzle pattern NP. However, since brightness correction also enhances patterns in the sheet (fiber patterns in the paper, for example) and digital noise, determining the quality of the nozzles Nz through the image process may be difficult. Since the filter FL in the present embodiment can reduce such patterns in the sheet and digital noise, the present embodiment can improve accuracy in determining the quality of nozzles Nz through the image process. Thus, inexpensive ink can be used at low density to greatly reduce manufacturing costs. Note that steps S460 and S470 of FIG. 12 may be omitted. The processed image data stored in the storage device 215 in S450 may be used in various processes other than the processes in S460 and S470. For example, the processor 210 may display a processed image on the display unit 240 based on the processed image data. By viewing the processed image, the operator can easily identify problems in lines PL (and hence, defects in nozzles Nz).

In the present embodiment, the image process is performed using the filter FL in place of the learning model 235. Hence, the quantity of computations required for image processing can be greatly reduced.

B. Second Embodiment

Figure 13:
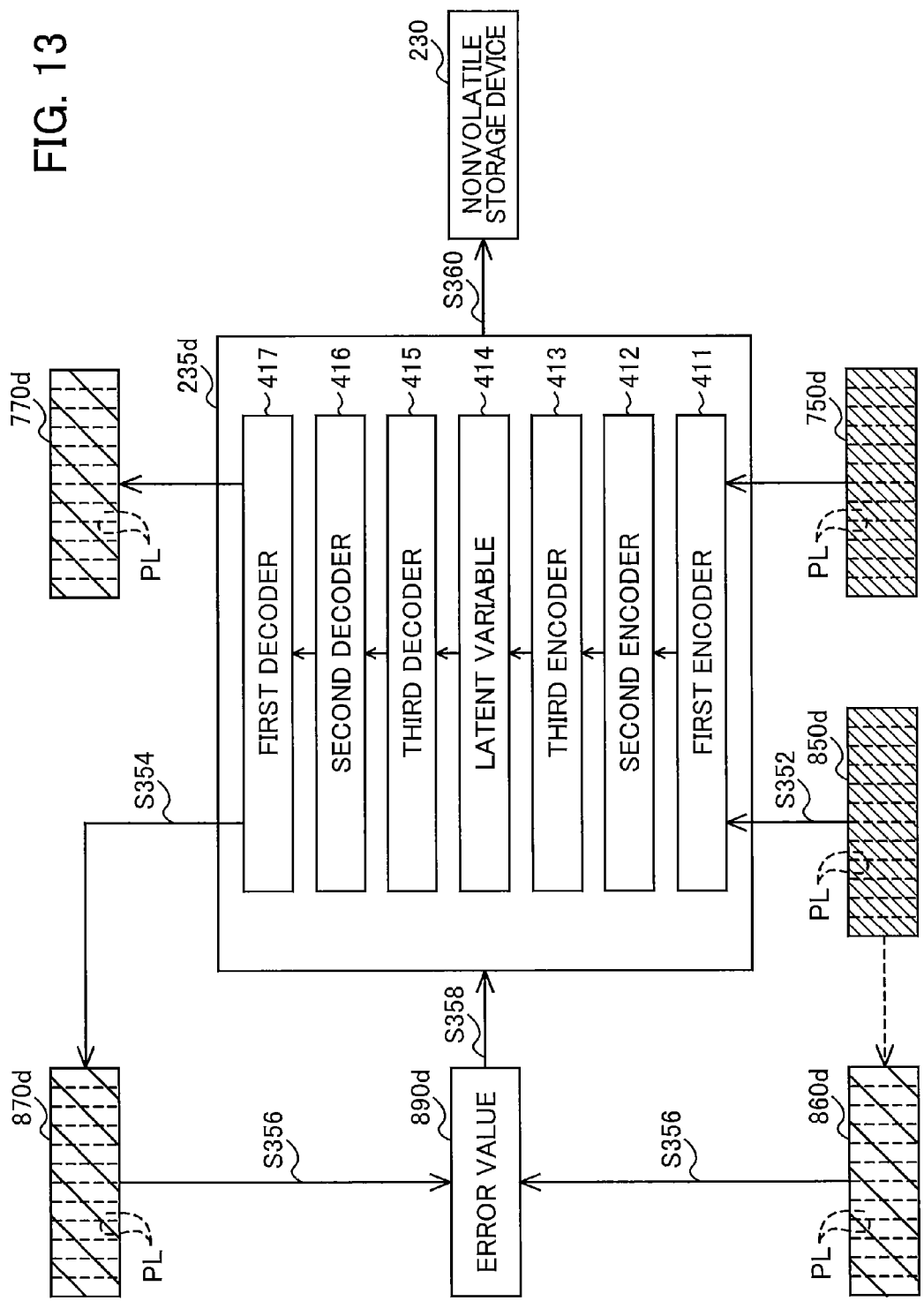
FIG. 13 is a block diagram illustrating a learning model of a second embodiment.

FIG. 13 is a block diagram illustrating another embodiment, i.e., a second embodiment of the learning model 235*d*. The learning model 235*d* of the second embodiment is an artificial neural network model referred to as an autoencoder. In this embodiment, the learning model 235*d* uses inputted image data to generate image data with reduced noise. The learning model 235*d* can be used in place of the learning model 235 described in the first embodiment.

The learning model 235*d* is provided with a first encoder 411, a second encoder 412, a third encoder 413, a third decoder 415, a second decoder 416, and a first decoder 417, for example. These processing units 411 through 413 and 415 through 417 are connected in the order given. The encoders 411 through 413 extract a feature of the image to generate a latent variable 414 representing the extracted feature. Each of the encoders 411 through 413 is configured of a convolutional layer, and a pooling layer that processes data outputted from the convolutional layer, for example. The decoders 415 through 417 generate image data by reconstructing the feature represented by the latent variable 414. Each of the decoders 415 through 417 is configured of a convolutional layer, and an upsampling layer that processes data outputted from the convolutional layer, for example.

The noisy pattern image and the reduced-noise pattern image that are generated in the example of FIG. 4 are used for training the learning model 235*d*. Training is performed according to the process described in the first embodiment with reference to FIG. 10A. The following description will assume that the multifunction peripheral 200 (see FIG. 1) executes this training. Note that training may be executed by another data processing device having a high computing power.

In S352 of FIG. 13, the processor 210 inputs noisy pattern image data 850*d* into the learning model 235*d*. In S354 the processor 210 generates output image data 870*d* by performing operations with the learning model 235*d*. In S356 the processor 210 calculates an error value 890*d* according to the loss function LF (see FIG. 10B) based on reduced-noise pattern image data 860*d* and the output image data 870*d*. Note that the reduced-noise pattern image data 860*d* is data corresponding to the noisy pattern image data 850*d*. In S358 the processor 210 adjusts the operation parameters in the learning model 235*d* according to a predetermined algorithm so that the error value 890*d* is reduced. The adjusted operation parameters include the weights and biases of the convolution filters in the processing units 411 through 413 and 415 through 417. The predetermined algorithm may be one that uses the backpropagation method and gradient descent method, for example. The processor 210 repeatedly performs the steps S352 through S358 described above. Once the condition for completing training has been met, in S360 the processor 210 stores the learning model 235*d* after training in the nonvolatile storage device 230.

The learning model 235*d* after training is used in a process for reducing noise in image data. The processor 210 inputs scanned data 750*d* of the nozzle pattern NP (see FIG. 13) into the learning model 235*d*. By performing an operation on the data with the learning model 235*d*, the processor 210 can generate output data 770*d* of the image with reduced noise.

C. Third Embodiment

Figure 14:
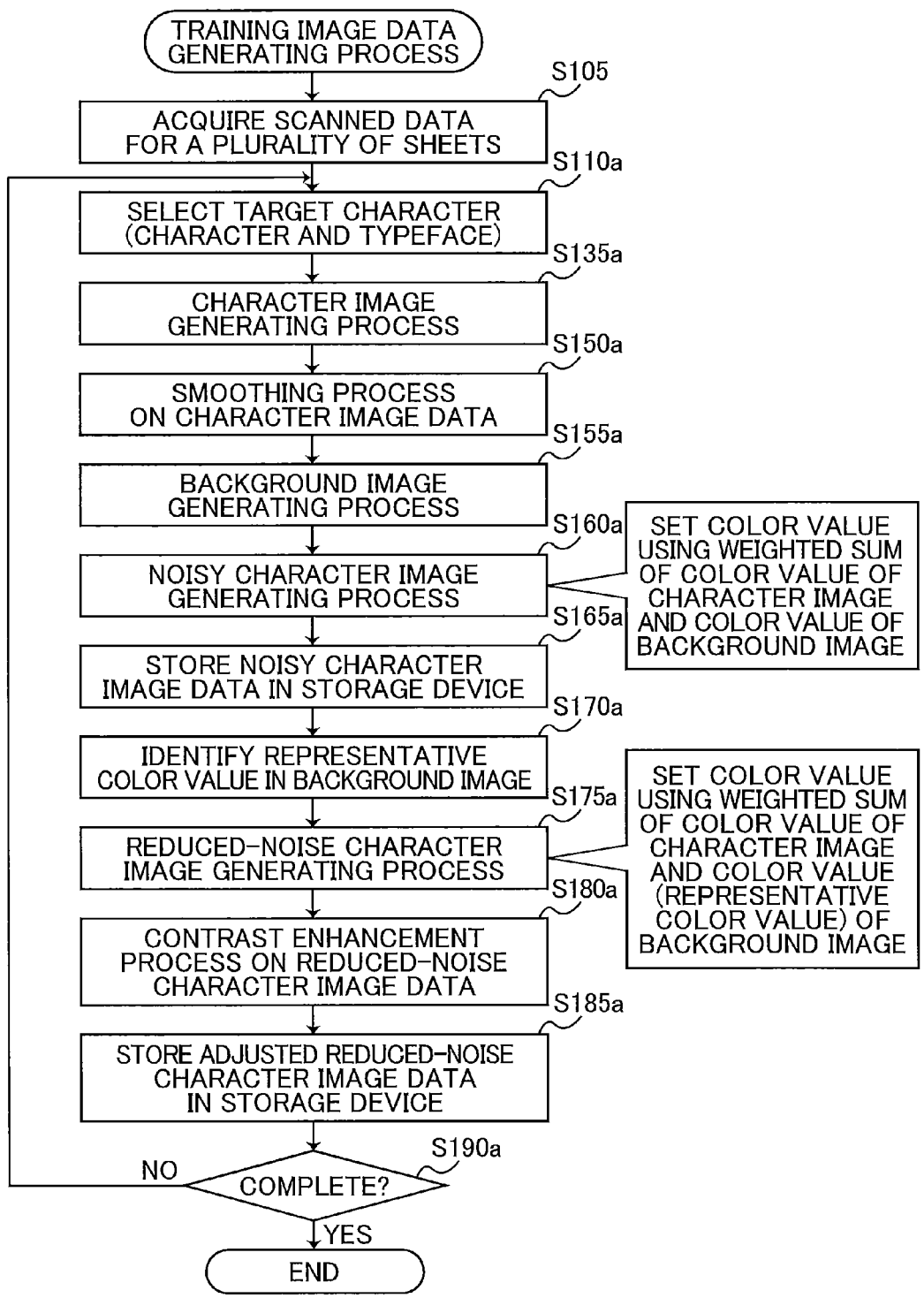
FIG. 14 is a flowchart illustrating steps in a training image data generating process executed by a processor of a multifunction peripheral according to a third embodiment.
Figure 15A:
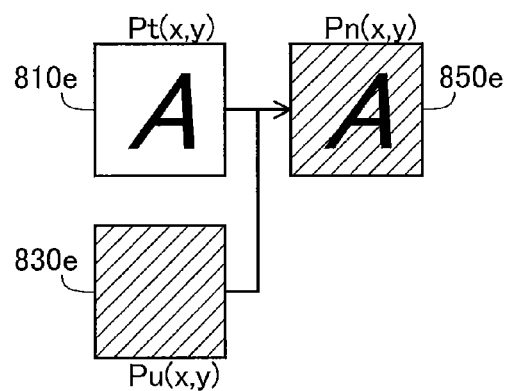
Figure 15B:
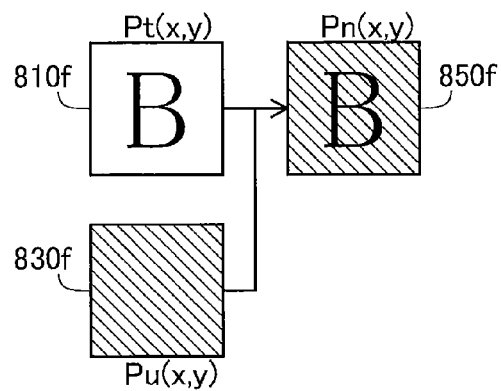

FIG. 14 is a flowchart illustrating steps in a process according to a third embodiment for generating training image data (training image data generating process). This process differs from the process in FIG. 4 according to the first embodiment in that an image of a character is generated in place of an image of the nozzle pattern NP. S105 is identical to the same step in FIG. 4. In S110a the processor 210 selects a target character from among characters to be processed. In the present embodiment, the target character is identified by a combination of a character and typeface. The character is selected from a predetermined character set (the set of alphabetic and numeric characters, for example). The typeface is selected from a plurality of predetermined typefaces (normal, boldface, and italics, for example). In S135a the processor 210 generates character image data for the character image, i.e., the image of the target character (character image generating process). The luminance values for pixels representing the character are set to 0, and the luminance values for pixels representing the background are set to 255. In S150a the processor 210 executes a smoothing process on the character image data, as in S150 of FIG. 4. FIGS. 15A through 15D are explanatory diagrams of the training image data. FIGS. 15A and 15B illustrate character images 810e and 810f. In the present embodiment, the character images 810e and 810f are images of single characters. The size of the character images 810e and 810f is predetermined.

In S155a of FIG. 14, the processor 210 generates first background image data (background image generating process), as in S155 of FIG. 4. The first background image has the same size as the character image. FIGS. 15A and 15B respectively illustrate first background images 830e and 830f. In S160a the processor 210 generates noisy character image data (noisy character image generating process), as in S160 of FIG. 4. FIGS. 15A and 15B respectively illustrate noisy character images 850e and 850f. The luminance value Pn(x, y) for the noisy character images 850e and 850f are calculated according to the formula shown in FIG. 8D using the luminance value Pt(x, y) for the corresponding character images 810e and 810f and the luminance value Pu(x, y) for the corresponding first background images 830e and 830f. In S165a the processor 210 stores the noisy character image data generated in S160a in the storage device 215 (the nonvolatile storage device 230 in the present embodiment).

Figure 15C:
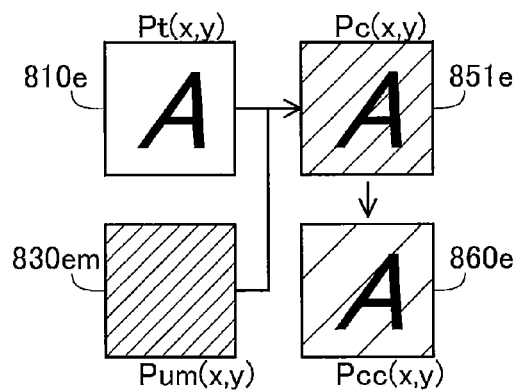
Figure 15D:
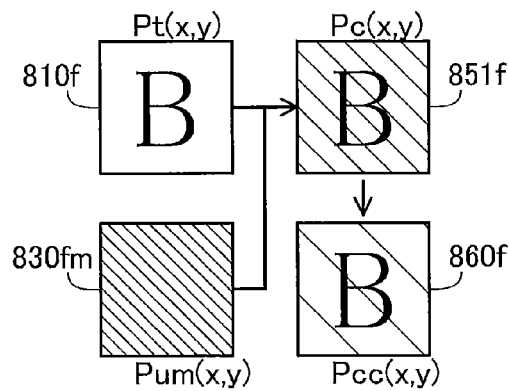

In S170a the processor 210 identifies a representative color value in the first background image, as in S170 of FIG. 4. In S175a the processor 210 generates reduced-noise character image data (reduced-noise character image generating process), as in S175 of FIG. 4. FIGS. 15C and 15D respectively illustrate the character images 810e and 810f, second background images 830em and 830fm represented by the representative color value, and reduced-noise character images 851e and 851f. The luminance value Pc(x, y) for the reduced-noise character images 851e and 851f is calculated according to the formula shown in FIG. 9D using the luminance value Pt(x, y) for the corresponding character images 810e and 810f and the luminance value Pum(x, y) for the corresponding second background images 830em and 830fm.

In S180a the processor 210 executes a contrast enhancement process on the reduced-noise character image data, as in S180 of FIG. 4. FIGS. 15C and 15D respectively illustrate enhanced-contrast reduced-noise character images 860e and 860f. In S185a the processor 210 stores the adjusted reduced-noise character image data with enhanced contrast in the storage device 215 (the nonvolatile storage device 230 in the present embodiment) in association with the corresponding noisy character image data.

In S190a the processor 210 determines whether generation of image data is complete. In the present embodiment, the condition for completion is that image data has been generated for all combinations of the plurality of characters and the plurality of typefaces, but the condition for completion may be any of various other conditions. When the generation of image data is not complete (S190a: NO), the processor 210 selects an unprocessed combination in S110a. Once the generation of image data is complete (S190a: YES), the processor 210 ends the process in FIG. 14.

The noisy character image data and the adjusted reduced-noise character image data generated in the third embodiment can be used to train various prediction models, such as the learning model 235 and learning model 235d (see FIGS. 3 and 13). Here, the character image data may represent characters that do not have linear symmetry. An example of a character with no linear symmetry is "F". Hence, the second term Lfilter may be omitted from the loss function LF (see FIG. 10B).

D. Fourth Embodiment

FIG. 16 is a block diagram of a learning model 235g according to a fourth embodiment. The learning model 235g according to the fourth embodiment is an artificial neural network model known as a convolutional neural network. In the present embodiment, the learning model 235g sorts images into a plurality of categories. Specifically, the learning model 235g sorts images of nozzle patterns NP into standard nozzle patterns NP and nonstandard nozzle patterns NP.

The learning model 235g is provided with a first convolutional layer 421, a first pooling layer 422, a second convolutional layer 423, a second pooling layer 424, a first fully connected layer 425, a second fully connected layer 426, and a third fully connected layer 427, for example. These processing units 421 through 427 are connected in the order given. The learning model 235g is a typical convolutional neural network model. The learning model 235g uses the inputted image data to generate output data OD specifying a probability PA of a standard nozzle pattern NP, and a probability PB of a nonstandard nozzle pattern NP.

A noisy pattern image generated in the process of FIG. 4 according to the first embodiment is used for training the learning model 235g. As described above, a plurality of noisy pattern images includes images representing standard nozzle patterns NP and images representing nonstandard nozzle patterns NP. Label data specifying either "standard" or "nonstandard" is associated with each noisy pattern image. This label data is used as supervised data indicating the desired value of the output data. In the present embodiment, the adjusted reduced-noise pattern image data is not used. Hence, the process for generating adjusted reduced-noise pattern image data may be omitted. The following description will assume that the multifunction peripheral 200 executes training. Note that training may be executed by another data processing device having a high computing power.

In S372 of FIG. 16, the processor 210 inputs noisy pattern image data 850g into the learning model 235g. In S374 the processor 210 generates the output data OD by performing an operation with the learning model 235g. In S376 the processor 210 uses the output data OD and supervised data 880g to calculate an error value 890g according to a predetermined loss function. The loss function may be any of various functions suitable for the sorting category, such as cross entropy error. The supervised data 880g is the label data associated with the noisy pattern image data 850g. In S378 the processor 210 adjusts the operation parameters of the learning model 235g according to a predetermined algorithm in order to reduce the error value 890g. The adjusted operation parameters include weights and biases in the convolution filters of the convolutional layers 421 and 423 and weights and biases in the fully connected layers 425, 426, and 427. The predetermined algorithm may be one that uses the backpropagation method and gradient descent method, for example. The processor 210 repeatedly performs steps S372 through S378 described above. Once the condition for completing training has been met, in S380 the processor 210 stores the learning model 235g after training in the nonvolatile storage device 230.

The learning model 235g after training is used for sorting nozzle patterns NP. The processor 210 inputs scanned data 750g for the nozzle pattern NP (see FIG. 16) into the learning model 235g to generate the output data OD through the operations of the learning model 235g. The processor 210 references the probabilities PA and PB in the output data OD to sort the nozzle pattern NP in the input image into the category with the highest probability.

E. Variations of the Embodiments (1) The training image data generating process may be any of various processes used in place of the processes described above. For example, in S105 of FIGS. 4 and 14, the processor 210 may acquire one set of scanned data for one sheet. Subsequently, in S155 and S155a the processor 210 may generate first background image data from the set of scanned data. Further, one set of first background image data may be shared among a plurality of sets of training image data. Further, the weight k1 in FIG. 9D may differ from the weight k1 in FIG. 8D, and the weight k2 in FIG. 9D may differ from the weight k2 in FIG. 8D. In any case, the weights k1 and k2 in FIG. 9D are preferably larger than 0. In the process of FIG. 6A, one or two of the parameters for width, luminance value, and position may be modified from their standard values. Hence, one or two of the three parameters may be fixed at their standard values.

Additionally, the smoothing processes in S150 and S150a may be omitted from the corresponding processes in FIGS. 4 and 14. Further, the contrast enhancement processes of S180 and S180a may also be omitted from the corresponding processes in FIGS. 4 and 14.

(2) The second term Lfilter of the loss function LF (see FIG. 10B) may be expressed by various functions that calculate a larger value for larger differences among two weights at linearly symmetrical positions. For example, the second term Lfilter may be the mean square of differences between two weights.

(3) The filter FL (see FIG. 10C) may be any of various sizes, such as Fx=7 and Fy=7. Additionally, the horizontal size Fx may differ from the vertical size Fy. Further, in order to improve the symmetry of weights W relative to the filter axis of symmetry AxF, the size of the filter FL in the direction orthogonal to the filter axis of symmetry AxF (the horizontal size Fx in this case) is preferably an odd number.

(4) The test pattern printed by the printing device 100 may be any of various patterns other than the nozzle pattern NP that includes a plurality of lines PL (see FIG. 2A). For example, the test pattern may be a grid pattern that includes a plurality of vertical lines and a plurality of horizontal lines. The test pattern may include patterns of various shapes, such as circles, ellipses, triangles, and rectangles. The test pattern may include specific parts having shapes that are linearly symmetric to the axis of symmetry, such as lines, circles, ellipses, triangles, and rectangles. When the loss function LF includes a second term for improving the symmetry of weights W in the filter FL, the loss function LF can suppress distortion (positional deviation, for example) of specific parts caused by image processing with the filter FL. Further, the size of the filter FL in the direction orthogonal to the filter axis of symmetry AxF (the horizontal size Fx in the example of FIG. 10C) may be the same as or smaller than the size of the specific part in the direction orthogonal to the axis of symmetry (the width of the line PL, for example). The test pattern may include both the specific part described above (the nozzle pattern NP, for example) and a character. The test pattern may include both a figure and a character. Note that the specific part described above may be omitted from the test pattern, in which case the second term may be omitted from the loss function LF.

(5) The image data may be expressed by a plurality of color components, such as RGB, CMYK, YCbCr, and the like. The scanned data, input data, output data, training image data (noisy pattern image data, reduced-noise pattern image data, etc.), and target data described above may all be RGB bitmap data. If the color value for each pixel in the image data is expressed as u number of gradation values for u number of color components (where u is an integer greater than or equal to one), the filter FL in FIGS. 3 and 10C includes (Fx×Fy×u) number of weights. This single filter FL may be broken down into u number of subfilters corresponding to the u number of color components. One subfilter is configured of (Fx×Fy) number of weights and is applied to gradation values of the corresponding color component. Here, the second term Lfilter of the loss function LF (see FIG. 10B) is preferably an overall evaluation value indicating the degree of symmetry for each of the u number of subfilters. For example, the formula for the second term Lfilter shown in FIG. 10B may be used as the formula for the evaluation value of one subfilter. Various values identified using the u number of evaluation values of the u number of subfilters (a representative value such as the mean or median, or the sum) may be used as the overall evaluation value of the u number of subfilters.

(6) The prediction model may have various other configurations than the configurations of the learning models 235, 235d, and 235g in FIGS. 3, 13, and 16. The prediction model is not limited to a model for reducing noise in image data or sorting image data, but may be a model that performs various other processes. The prediction model may include one or more models selected arbitrary from a group of artificial neural networks, hidden Markov models, and inference engines.

(7) The device used to optically scan images may be any of various reading devices, such as a digital camera, instead of the reading unit 300.

(8) Each of the various data processes, including the training image data generating process, the training process for the prediction model, and the image process using a filter may be executed on separate data processing devices. The data processing devices may be various devices other than the multifunction peripheral 200, such as a personal computer, a digital camera, a scanner, or a smartphone. Further, a plurality of devices that can communicate over a network (computers, for example) may each implement some of the functions in the data process performed by the data processing device so that the devices as a whole can provide the functions required for the data process. Here, the system comprising these devices corresponds to the data processing device of the present disclosure.

Part of the configuration implemented in hardware in the embodiments described above may be replaced with software and, conversely, all or part of the configuration implemented in software may be replaced with hardware. For example, the learning models 235, 235*d*, and 235*g* (see FIGS. 3, 13, and 16) may be implemented with hardware circuits, such as an application-specific integrated circuit (ASIC), rather than a program module.

When all or some of the functions of the present disclosure are implemented with computer programs, the programs may be stored on a computer-readable storage medium (a non-transitory storage medium, for example). The programs may be used on the same storage medium on which they were supplied or may be transferred to a different storage medium (a computer-readable storage medium). The "computer-readable storage medium" may be a portable storage medium, such as a memory card or CD-ROM; an internal storage device built into the computer, such as any of various ROM or the like; or an external storage device, such as a hard disk drive, connected to the computer.

While the description has been made in detail with reference to specific embodiments and variations, it would be apparent to those skilled in the art that various changes and modifications may be made thereto.

What is claimed is:

1. A method for generating an image processing filter for image processing, the method comprising:
    adjusting a convolution filter using a neural network to acquire an adjusted convolution filter, the convolution filter including a plurality of weights corresponding to respective ones of a plurality of pixels within a filter region, the neural network being configured of a convolutional layer configured to perform convolution using the convolution filter, the adjusting comprising:
        inputting first training image data into the neural network to generate output image data;
        calculating an evaluation value based on a loss function using the output image data and second training image data; and
        adjusting the plurality of weights to respective ones of a plurality of adjusted weights so as to reduce the evaluation value, the adjusted convolution filter including the plurality of adjusted weights; and
    extracting data from the adjusted convolution filter as data for the image processing filter,
    wherein the first training image data represents a first training image including noise, the first training image reproducing a test pattern including a specific part having a shape linearly symmetric to an axis of symmetry,
    wherein the second training image data represents a second training image including reduced noise compared to the first training image, the second training image reproducing the test pattern, and
    wherein the loss function includes a first term and a second term, the first term specifying a magnitude of a difference between the output image data and the second training image data, the second term growing smaller as symmetry of the plurality of weights relative to a filter axis of symmetry in the filter region increases, the filter axis of symmetry being parallel to the axis of symmetry.

2. The method according to claim 1, wherein the second training image has more enhanced contrast than the first training image.

3. The method according to claim 1, wherein the second term is smaller for a smaller difference between a first weight and a second weight included in the plurality of weights, the first weight and the second weight being arranged in the filter region at symmetric positions about the filter axis of symmetry.

4. An image processing method using an image processing filter comprising:
    generating data for the image processing filter in accordance with the method according to claim 1;
    acquiring target data representing a nozzle pattern by optically reading the nozzle pattern printed on a sheet, the nozzle pattern being printed on the sheet by a printing device having a print head, the print head having a plurality of nozzles each of which configured to eject ink, the nozzle pattern including a plurality of lines, the plurality of lines being parallel to each other, each of the plurality of lines having a center axis and having a symmetric shape relative to the center axis, each of the plurality of lines being printed by one of the plurality of nozzles;
    generating processed image data by executing an image process on the target data using the image processing filter; and
    storing the processed image data in a storage device.

5. A method for generating training image data to be used for training a prediction model, comprising:
    (a) generating first training image data representing a first training image formed by arranging an object image of an object on a first background image, the first background image being at least a portion of a sheet image acquired by optically reading a sheet to be used for printing; and
    (b) storing the first training image data in a storing device, wherein the (a) generating comprises:
        (a1) setting a color value for a first object pixel within an object region of the first training image in which the object image is arranged, the color value for the first object pixel being set to a sum of a first value and a second value, the first value being obtained by multiplying a color value for a pixel corresponding to the first object pixel in the object image by a first object coefficient greater than zero, the second value being obtained by multiplying a color value for a pixel corresponding to the first object pixel in the first background image by a first background coefficient greater than zero; and
        (a2) setting a color value for a first background pixel within a nonobject region of the first training image in which the object image is not arranged, the color value for the first background pixel being set to a value obtained by multiplying a color value for a pixel corresponding to the first background pixel in the first background image by a coefficient greater than the first background coefficient.

6. The method according to claim 5, further comprising:
    (c) identifying a representative color value in the first background image, a plurality of color values for respective ones of a plurality of first background pixels being set in the (a1) setting, the representative color value representing at least part of the plurality of color values for respective ones of the plurality of first background pixels;
    (d) generating second training image data representing a second training image formed by arranging the object image on a second background image represented by the representative color value; and
    (e) storing the second training image data in the storing device, wherein the (d) generating comprises:
- (d1) setting a color value for a second object pixel within an object region of the second training image in which the object image is arranged, the color value for the second object pixel being set to a sum of a third value and a fourth value, the third value being obtained by multiplying a color value for a pixel corresponding to the second object pixel in the object image by a second object coefficient greater than zero, the second value being obtained by multiplying the representative color value by a second background coefficient greater than zero; and
- (d2) setting a color value for a second background pixel within a nonobject region of the second training image in which the object image is not arranged, the color value for the second background pixel being set to a value obtained by multiplying the representative color value by a coefficient greater than the second background coefficient.

7. The method according to claim 6, wherein the representative color value is an average value of the at least part of the plurality of color values for respective ones of the plurality of first background pixels.

8. The method according to claim 5, wherein the object includes of lines aligned in a first direction, the M number of lines being juxtaposed in a second direction orthogonal to the first direction, where M is an integer greater than or equal to two.

9. The method according to claim 8, further comprising:
- (f) generating Q number of sets of first training image data representing respective ones of Q number of first training images by performing the (a) generating Q number of times, where Q is an integer greater than or equal to two,
- wherein each of the Q number of first training images includes the object image of the object including the M number of lines, the M number of lines including at least one nonstandard line different from a standard line, the standard line having a standard luminance and a standard line width and being positioned at a standard position in the second direction, the standard position of the standard line being associated with an order of the standard line among the M number of lines arranged in the second direction, each of the at least one nonstandard line having a luminance and a line width and being positioned at a position in the second position, at least one of the luminance, the line width, and the position being different from respective ones of the standard luminance, the standard line width, and the standard position.

10. The method according to claim 9, wherein the Q number of sets of first training image includes:
- at least one first training image including at least one nonstandard line each of which has the luminance different from the standard luminance;
- at least one first training image including at least one nonstandard line each of which is positioned at a position different from the standard position in the second direction; and
- at least one first training image including at least one nonstandard line each of which has a line width different from the standard line width.

11. The method according to claim 9, wherein a total number of the at least one nonstandard line included in each of the Q number of sets of first training image is different from each other.

12. The method according to claim 5, wherein the object includes a character.

13. A non-transitory computer readable storage medium storing a prediction model installed on and executed by a computer, the prediction model, when executed by the computer, causing the computer to perform generating relevant data based on image data representing a sheet image, the sheet image being generated by optically reading a sheet on which an object is printed, the relevant data being data about the object,
- wherein the prediction model has been trained using training image data representing a training image formed by arranging an object image of an object on a background image, the background image being at least a portion of a sheet image acquired by optically reading a sheet to be used for printing, and
- wherein the training image data is generated according to a method including:
  - setting a color value for an object pixel within an object region of the training image in which the object image is arranged, the color value for the object pixel being set to a sum of a first value and a second value, the first value being obtained by multiplying a color value for a pixel corresponding to the object pixel in the object image by an object coefficient greater than zero, the second value being obtained by multiplying a color value for a pixel corresponding to the object pixel in the background image by a background coefficient greater than zero; and
  - setting a color value for a background pixel within a nonobject region of the training image in which the object image is not arranged, the color value for the background pixel being set to a value obtained by multiplying a color value for a pixel corresponding to the background pixel in the background image by a coefficient greater than the background coefficient.

* * * * *